United States Patent
Yamamoto

(10) Patent No.: US 8,000,207 B2
(45) Date of Patent: Aug. 16, 2011

(54) METHOD FOR REPRODUCING HOLOGRAM

(75) Inventor: Yuichiro Yamamoto, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 55 days.

(21) Appl. No.: 12/638,089

(22) Filed: Dec. 15, 2009

(65) Prior Publication Data
US 2010/0149946 A1    Jun. 17, 2010

(30) Foreign Application Priority Data
Dec. 15, 2008    (JP) .................................. 2008-318877

(51) Int. Cl.
*G11B 7/00*    (2006.01)
(52) U.S. Cl. .................. 369/103; 369/124.01
(58) Field of Classification Search ................... None
See application file for complete search history.

(56) References Cited

U.S. PATENT DOCUMENTS

| | | | |
|---|---|---|---|
| 2006/0232574 A1 | 10/2006 | Miyazawa | |
| 2006/0232841 A1 | 10/2006 | Toishi et al. | |
| 2007/0211321 A1* | 9/2007 | Hoskins et al. | 359/24 |
| 2008/0239921 A1* | 10/2008 | Tatsuta et al. | 369/103 |

FOREIGN PATENT DOCUMENTS

| JP | 2004-354565 | 12/2004 |
|---|---|---|
| JP | 2006-267554 | 10/2006 |
| JP | 2006-317886 | 11/2006 |
| JP | 20063147886 | 11/2006 |

OTHER PUBLICATIONS

Toishi, et al. Improvement in Temperature Tolerance of Holographic Data Storage Using Wavelength Tunable Laser, Japanese Journal of Applied Physics, vol. 45, No. 2B, 2006, pp. 1297-1304.

Dhar, et al. Temperature-induced changes in photopolymer volume holograms, Applied Physics Letters, vol. 73, No. 10, Sep. 7, 1998, pp. 1337-1339.

Tanaka, et al. Tunable blue laser compensates for thermal expansion of the medium in holographic data storage, Applied Optics, vol. 46, No. 25, Sep. 1, 2007, pp. 6263-6272.

Kogelnik. Couple Wave Theory for Thick Hologram Gratings, The Bell System Technical Journal, vol. 48, No. 9, Nov. 1969, pp. 2909-2947.

* cited by examiner

*Primary Examiner* — Muhammad N Edun
(74) *Attorney, Agent, or Firm* — Turocy & Watson, LLP

(57) ABSTRACT

A method for reproducing a hologram includes: irradiating a recording disc with a first reference beam and a second reference beam, both having a parallel light flux, in different directions at a same incident angle to form a hologram having an unslanted grating pattern in which a grating vector is parallel to a light incident surface of the recording disc; irradiating the hologram with the first reference beam or the second reference beam to extract reproduced light; and detecting a position where an intensity of the reproduced light is maximum.

4 Claims, 25 Drawing Sheets

METHOD FOR REPRODUCING HOLOGRAM

CROSS-REFERENCE TO THE RELATED APPLICATION(S)

The present disclosure relates to the subject matters contained in Japanese Patent Application No. 2008-318877 filed on Dec. 15, 2009, which are incorporated herein by reference in its entirety.

FIELD

The present invention relates to a method for reproducing a hologram.

BACKGROUND

Since a CD (Compact Disc) is developed, capacity of an optical disc has been expanded while setting a shorter wavelength of a laser and a higher numerical aperture of an objective lens as main development targets. As a result of the emergence of a BD (Blu-ray Disc) using a blue-violet laser having a wavelength of 405 nm band and an objective lens having a numerical aperture of 0.85, the capacity of an optical disc is approaching near the limit. The reasons of the above are that, when the wavelength is 400 nm or shorter, substrate absorption becomes prominent, and that the numerical aperture of the objective lens is near 1 which is the physical limit.

In order to further increasing the capacity, as a successor of the above-described optical storage, a hologram recording/reproducing apparatus has been proposed.

A hologram recording/reproducing apparatus performs recording on the principle that signal beam and reference beam emitted from a light source are caused to interfere with each other in a recording medium, to record information three-dimensionally in the form of minute interference fringes (hologram). In the apparatus, plural sets of information can be multiply recorded in the same place of a recording medium. Therefore, the capacity can be significantly increased as compared with the two-dimensional recording of a current optical disc in which information is recorded in the form of pits or marks in a plane.

In accordance with the remarkable progress of the technical level of key components which are necessary for constructing a system of a hologram recording/reproducing apparatus, such as a spatial light modulator and an image pickup device, commercialization of a hologram recording/reproducing apparatus and widespread use subsequent thereto are becoming a real possibility.

In practical application of a hologram recording/reproducing apparatus, however, there is a difficulty of degradation of a reproduced image due to temperature difference. The difficulty is caused by a phenomenon that anisotropic thermal expansion of a hologram, and a change of the refractive index of a recording material occur with a change of the temperature, and the reference beam in reproduction does not satisfy the Bragg condition.

As a method which may solve the difficulty, there has been proposed a configuration in which the shift quantity of the reproduction wavelength is determined based on the temperature difference between recording and reproduction, and the oscillation wavelength of a variable wavelength laser is shifted. An example of such configuration is disclosed in JP-A-2006-267554 (corresponding U.S. publication is: US 2006/0232841 A1).

In the configuration disclosed in JP-A-2006-267554, although a certain improvement can be expected, however, it seems that a recording/reproducing method which is more accurate is necessary in view of configuring a stable system. Prior to compensation of a reproduced image in reproduction involving a temperature difference, therefore, a position servo control must be first accurately performed on a recorded portion. In this case, a method in which the position servo control is performed by using an external sensor may be employed. In the method, however, the stability is low in view of a temporal change of a recorded hologram, apparatus compatibility, etc. Therefore, it is preferred that a servo control is performed while a servo signal is produced by a recorded hologram itself. In the servo signal, with respect to uncertain variations such as disturbances against the temperature change and design errors, naturally, the system characteristic is requested to maintain the present status (hereinafter, this is referred to as robust). However, a simple method which can be used in a practical level has not been proposed.

SUMMARY

According to a first aspect of the invention, there is provided a method for reproducing a hologram, the method including: irradiating a recording disc with a first reference beam and a second reference beam, both having a parallel light flux, in different directions at a same incident angle to form a hologram having an unslanted grating pattern in which a grating vector is parallel to a light incident surface of the recording disc; irradiating the hologram with the first reference beam or the second reference beam to extract reproduced light; and detecting a position where an intensity of the reproduced light is maximum.

According to a second aspect of the invention, there is provided a method for reproducing a hologram, the method including: irradiating a recording disc with a first reference beam and a second reference beam, both having a parallel light flux, in different directions at a same incident angle to form a first hologram having an unslanted grating pattern in which a grating vector is parallel to a light incident surface of the recording disc; irradiating a position of the recording disc where the first hologram is formed with a first signal beam or a second signal beam which is produced as a binarized pattern by a spatial light modulator to cause interference with the first reference beam or the second reference beam to thereby to form a second hologram; irradiating the first hologram formed in the recording disc with the first reference beam or the second reference beam to extract reproduced light; detecting a position where an intensity of the reproduced light is maximum while rotating the recording disc about an axis that is perpendicular to the grating vector of the unslanted grating pattern, the axis being on the light incident surface of the recording disc; detecting a position where an intensity of the reproduced light is maximum while rotating the recording disc in a direction perpendicular to the grating vector; and irradiating the detected position with the first reference beam or the second reference beam to reproduce the second hologram formed at the position where the first hologram is formed.

According to a third aspect of the invention, there is provided a method for reproducing a hologram, the method including: irradiating a recording disc with a first reference beam and a second reference beam, both having a parallel light flux, in different directions at a same incident angle to form a first hologram having an unslanted grating pattern in which a grating vector is parallel to a light incident surface of the recording disc; irradiating a position of the recording disc where the first hologram is formed with a first signal beam or a second signal beam which is produced as a binarized pattern by a spatial light modulator to cause interference with the first reference beam or the second reference beam to thereby to form a second hologram; irradiating the first hologram formed in the recording disc with the first reference beam or the second reference beam to extract reproduced light; detecting a position where an intensity of the reproduced light is maximum while rotating the recording disc in a direction perpendicular to the grating vector of the unslanted grating pattern; detecting a position where an intensity of the reproduced light is maximum while rotating the recording disc about an axis that is perpendicular to the grating vector, the axis being on the light incident surface of the recording disc; and irradiating the detected position with the first reference beam or the second reference beam to reproduce the second hologram formed at the position where the first hologram is formed.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

DETAILED DESCRIPTION OF THE EMBODIMENTS

Figure 1:
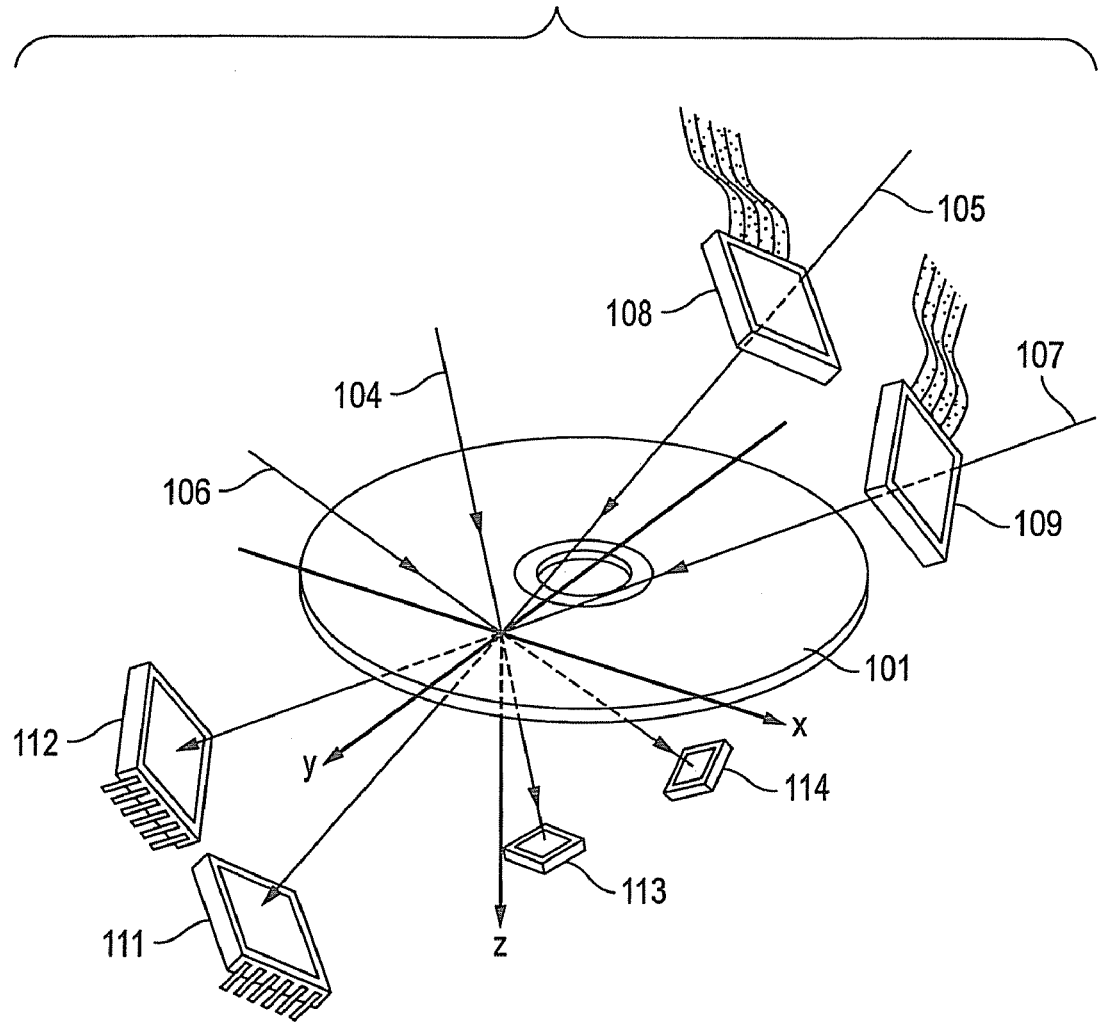
FIG. 1 is a diagram of a hologram reproducing apparatus according to a first embodiment.

Hereinafter, embodiments of the invention will be described with reference to the drawings. In the following description, the same or similar components will be denoted by the same reference numerals, and the duplicate description thereof will be omitted.

First Embodiment

Figure 2:
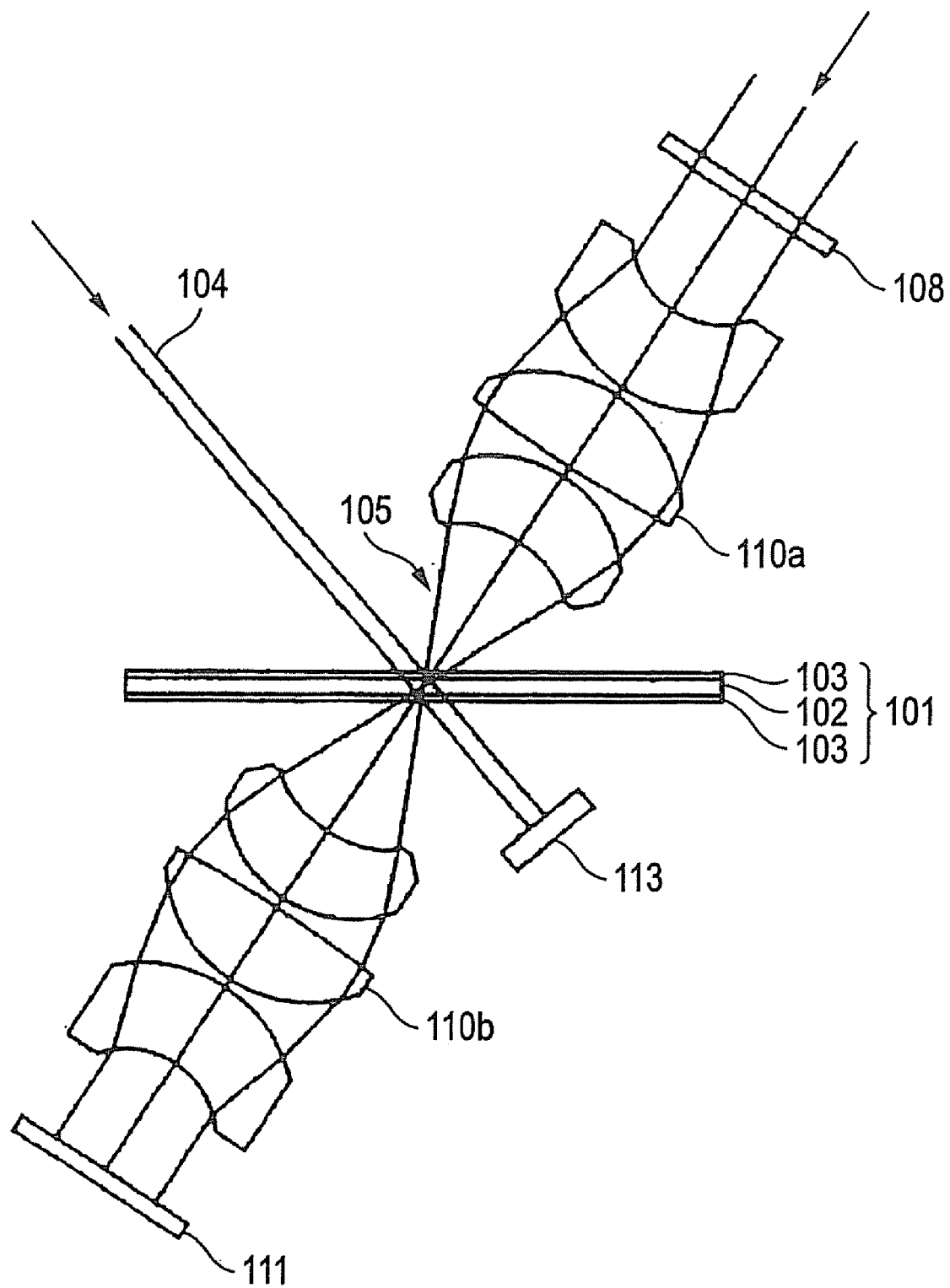
FIG. 2 is a diagram of a recording medium and an optical system according to the first embodiment.

FIG. 1 is a diagram of a hologram reproducing apparatus according to a first embodiment of the present invention, and FIG. 2 is a diagram of a recording medium and an optical system.

As shown in FIG. 1, the hologram reproducing apparatus according to the first embodiment includes a recording disc 101, a first reference beam 104 and a second reference beam 106 which are emitted from a light source (not shown), a first signal beam 105, a second signal beam 107, spatial light modulators 108, 109, image pickup devices 111, 112, and photodetectors 113, 114. In the light source which emits the first reference beam 104 and the second reference beam 106, a plurality of light sources may be used, or a light source which is split by a beam splitter may be used.

A hologram is recorded into the recording disc 101 by means of interference between reference beam and signal beam. In the embodiment, two sets of the first reference beam 104 and the first signal beam 105, and the second reference beam 106 and the second signal beam 107 are used. An example of a hologram reproducing apparatus which uses two sets of reference beam and signal beam is disclosed in JP-A-2004-354565.

The spatial light modulators 108, 109 modulate intensity of light from the light source to a binary pattern consisting of bright and dark points, to produce the first signal beam 105 and the second signal beam 107.

As the spatial light modulators 108, 109, preferably, a DMD (digital micro-mirror device), ferroelectric liquid crystal, or the like may be used.

The image pickup devices 111, 112 are used for reproducing an information hologram (this term may be used in the description for a hologram for main data to be distinguished from a servo hologram which will be described later), and detect reproduced light which is generated by irradiating the recording disc 101 with the first reference beam 104 or the second reference beam 106, and causing diffraction in the recording disc 101. As the image pickup devices 111, 112, preferably, a CCD or a CMOS may be used. The photodetectors 113, 114 detect the signal light intensity of the reproduced light from the recording disc 101. As the photodetectors 113, 114 a photodiode may be used.

As shown in FIG. 2, the recording disc 101 has a configuration in which a recording medium 102 is sandwiched by substrates 103. As the recording medium 102, a photopolymer is mainly used. A photopolymer is a photosensitive material in which photopolymerization of a polymerizable compound (monomer) may be used, and is a gelatinous material which contains as primary components a monomer, a photopolymerization initiator, and a matrix that has a porous structure, and that plays a role of holding the volume before and after recording. A photopolymer is being developed with the objectives of high sensitivity and improvement of multiple performance.

As the substrates 103, typically, polycarbonate, amorphous polyolefin, glass, or the like may be used. The primary objectives of the substrates 103 are to hold the shape of the photopolymer which is a gelatinous material, and to protect the photopolymer of the recording medium 102 from damage and dust.

In order to simplify the drawings, an objective lens is omitted in FIG. 1, and only the central ray of the first signal beam 105 is shown. As shown in FIG. 2, actually, a configuration in which light is converged on the recording disc 101 by using objective lenses 110a, 110b may be used. As the objective lenses 110a, 110b, a three-group three-element configuration is shown. The two objective lenses 110a, 110b are opposed to each other across the recording disc 101 in a so-called tandem arrangement. In the case where the objective lenses 110a, 110b having a high numerical aperture are used in the tandem arrangement, the performance as a multi-group lens is ensured with the objectives of reduction of the curvature of field, assuring the operating distance, and the like. While the objective lenses having the three-group three-element configuration are shown in the embodiment, it is a matter of course that the lenses are not restricted to this. With respect to the second signal beam 107, the identical configuration is employed, and hence its illustration is omitted in FIG. 2.

Next, an operation in the case where recording is performed on the recording disc 101 will be described.

The recording in the hologram reproducing apparatus to which the embodiment is applied is divided into two steps of "recording of servo hologram" and "recording of information hologram" which is normally performed. Hereinafter, description will be made in the sequence of "recording of servo hologram", "recording of information hologram", and "reproducing method".

Recording of Servo Hologram

The recording of a servo hologram is performed for the following reason. Because anisotropic thermal expansion of a hologram, and a change of the refractive index of the recording material occur with a change of the temperature, the reference beam in reproduction does not satisfy the Bragg condition. First, the reason will be described with reference to FIGS. 3 to 5.

Figure 3:
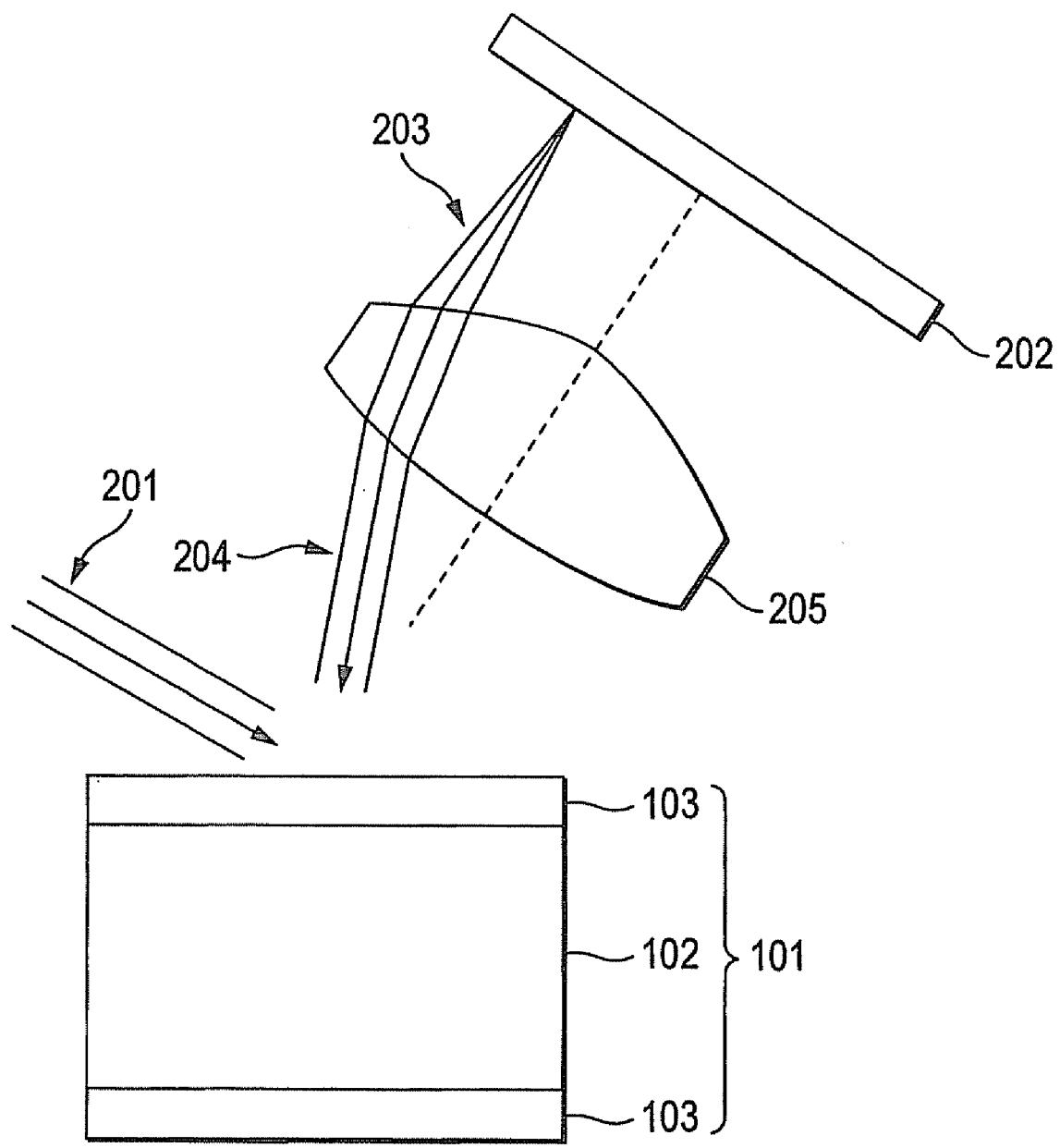
FIG. 3 is a diagram showing a cause of degradation of a reproduced signal in reproduction involving a temperature difference.

As shown in FIG. 3, the recording disc 101 has the configuration in which the recording medium 102 is sandwiched by the two substrates 103 as described with reference to FIG. 2. The recording disc 101 is irradiated with reference beam 201 and signal beam 203. The reference beam 201 is a parallel light flux. By contrast, a configuration where the signal beam 203 is converged on the recording disc 101 by an objective lens 205 is usually employed. When paying attention to the signal beam 203 from one pixel of a spatial light modulator 202, in a target optical arrangement, the light can be deemed a spherical wave from a point light source in FIG. 3, and signal beam 204 after passing through the objective lens 205 can be deemed a parallel light flux as illustrated. When a complex hologram which is recorded as result of interference between the reference beam 201 that is a parallel light flux, and the signal beam 204 that is a converging light flux is element reduced, the hologram can be considered as a superposition of holograms of parallel light fluxes.

Figure 4:
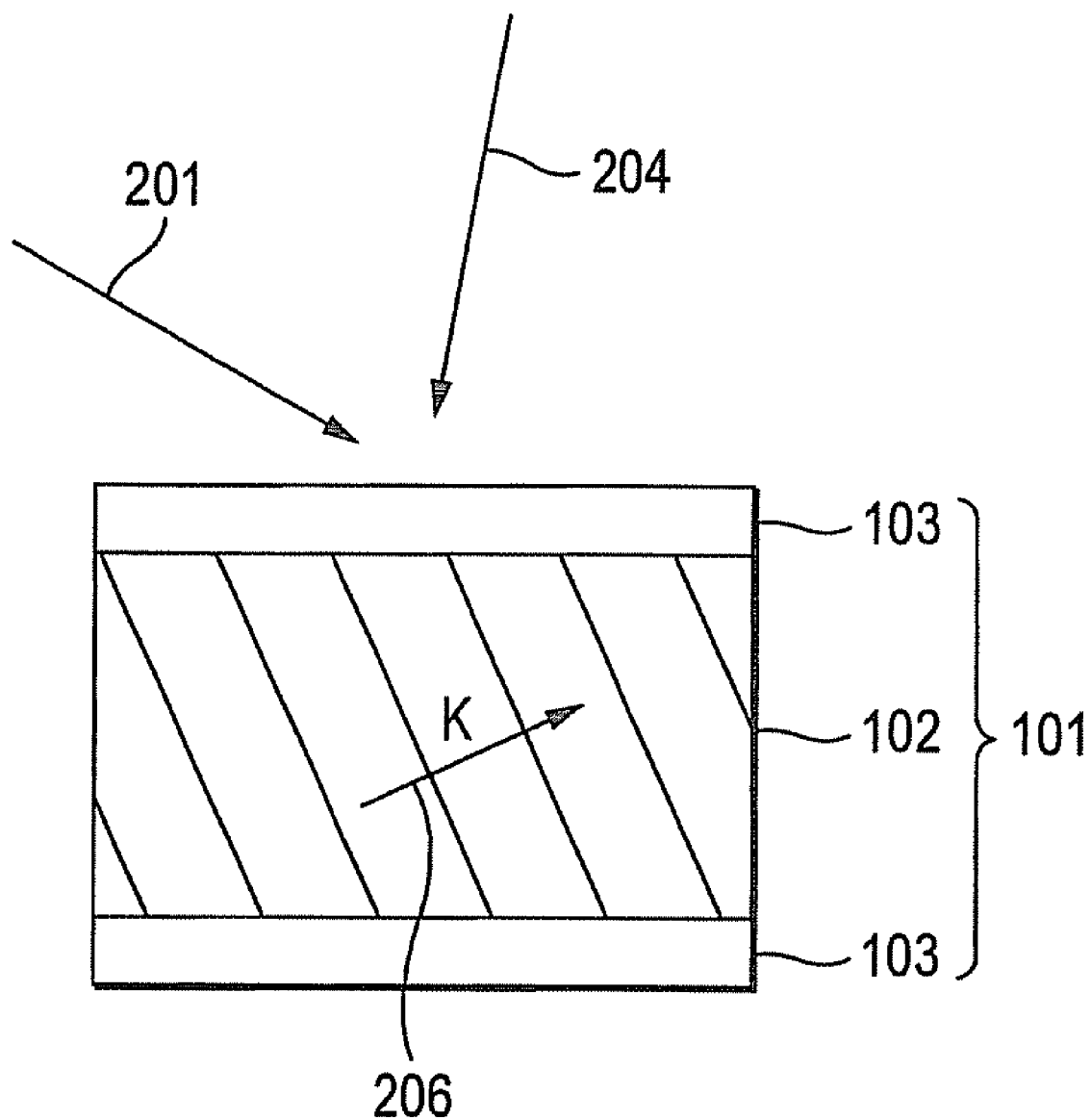
FIG. 4 is a diagram showing the cause of degradation of the reproduced signal in reproduction involving a temperature difference.

With reference to FIG. 4, a hologram which is recorded as result of interference between the reference beam 201 and signal beam 204 both of which are parallel light fluxes will be discussed. In FIG. 4, the reference symbol K indicates a grating vector 206 in recording. Usually, a hologram is a refractive index modulation grating. In this case, the grating vector 206 in recording is a vector perpendicular to a constant refractive index plane.

In the case where the recording disc 101 is heated, thermal expansion of the recording medium 102 is anisotropic because the recording medium 102 is sandwiched by the substrates 103, and the boundary conditions are different among the upper, lower, right, and left sides. The phenomenon that the thermal expansion is anisotropic is described in a related-art document 1 listed below.

Related-Art Document 1:

Lisa Dhar, Melinda G. Schnoes, Theresa L. Wysocki, Harvey Bair, Marcia Schilling, and Carol Boyd, "Temperature-induced changes in photopolymer volume holograms", Appl. Phys. Lett. 73, 1337-1339 (1998)

Figure 5:
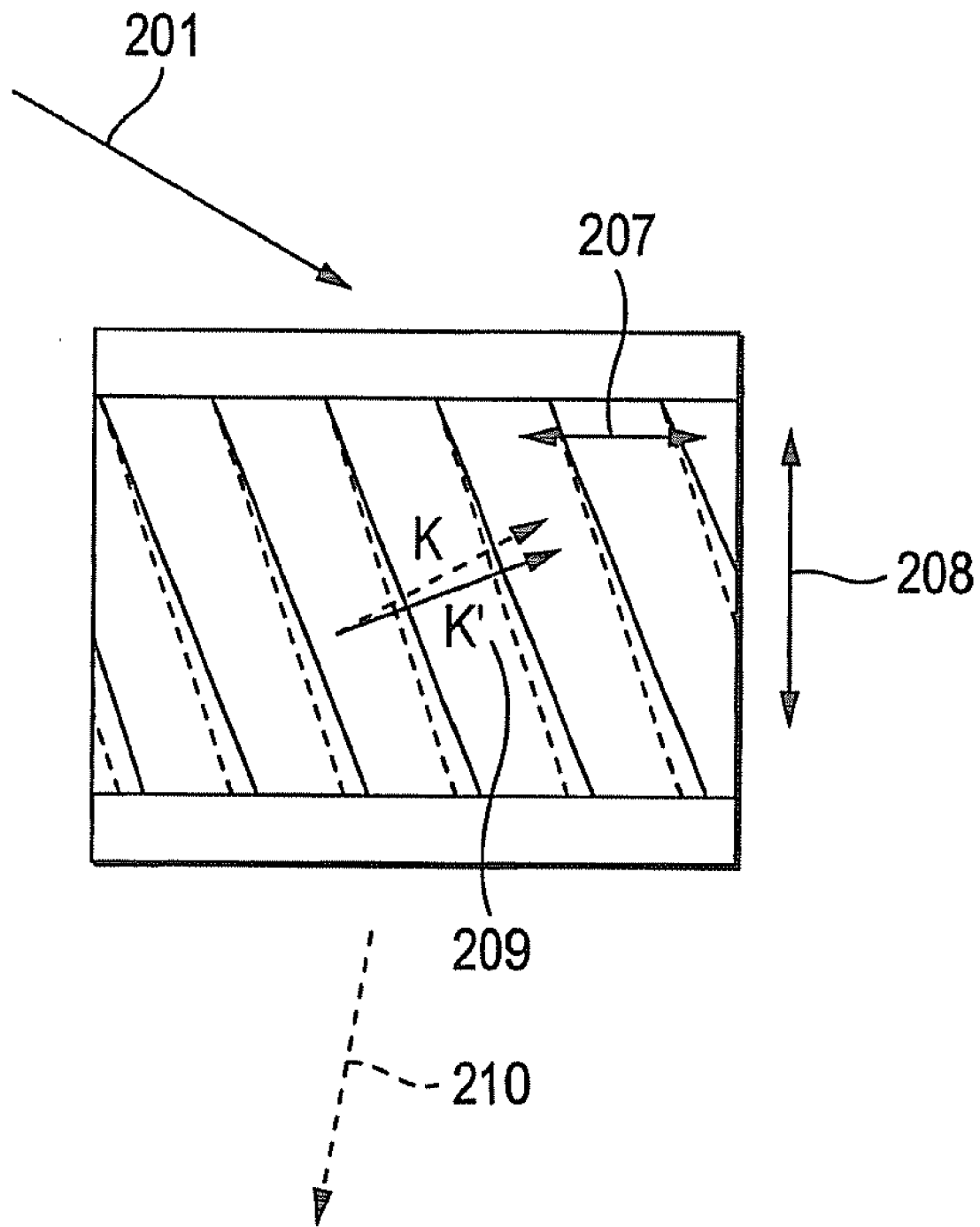
FIG. 5 is a diagram showing the cause of degradation of the reproduced signal in reproduction involving a temperature difference.

As shown in FIG. 5, thermal expansion (the arrow 207 shown in FIG. 5) in the in-plane direction of the recording disc 101, and that (the arrow 208 shown in FIG. 5) in the thickness direction of the recording medium are different from each other. This is described in a document listed below. According to the physical model described in the related-art document 2, the coefficient of linear expansion in the in-plane direction is given by the coefficient of linear expansion of the substrates, and the coefficient of linear expansion in the thickness direction of the recording medium is given by the coefficient of linear expansion of the recording medium. Here, it is assumed that the recording medium 102 is a photopolymer, and the substrates 103 are glass substrates.

Related-Art Document 2:

Mitsuru Toishi, Tomiji Tanaka, Mikio Sugiki, and Kenjiro Watanabe, "Improvement in Temperature Tolerance of Holographic Data Storage Using Wavelength Tunable Laser", Jpn. J. Appl. Phys., Vol. 45, 2B, pp 1297-1304 (2006)

According to, for example, a related-art document 3 listed below, the coefficient of linear expansion of a photopolymer is $5 \times 10^{-4}$ [/K], and that of glass is $7 \times 10^{-6}$ [/K]. Since the coefficient of linear expansion of the recording medium 102 is larger by one digit or more than that of the substrates 103, the expansion in the thickness direction is much larger than that in the in-plane direction of the disc.

Related-Art Document 3:

Tomiji Tanaka, Kageyasu Sako, Ryo Kasegawa, Mitsuru Toishi, and Kenjiro Watanabe, "Tunable blue laser compensates for thermal expansion of the medium in holographic data storage", Appl. Opt. 46, pp 6263-6272 (2007)

As shown in FIG. 5, due to the anisotropic thermal expansion, the grating vector K (206) in recording is changed to a grating vector K' (209) after the temperature change. Moreover, also the refractive index change of the photopolymer due to the temperature change is added. Therefore, even when the recording disc is irradiated with the reference beam 201 which is identical with that in recording, the Bragg condition is not satisfied, with the result that the signal of the reproduced light 210 is degraded.

In addition, in order to increase the capacity of a hologram recording/reproducing apparatus of the two-flux type, it is target to reduce the angle step of the angle multiplexing to increase the multiplicity. Therefore, it is necessary to increase the thickness of the medium to reduce the angular selectivity. As the medium is made thicker, however, degradation of the reproduced signal in reproduction involving a temperature difference is more conspicuous.

Figure 6:
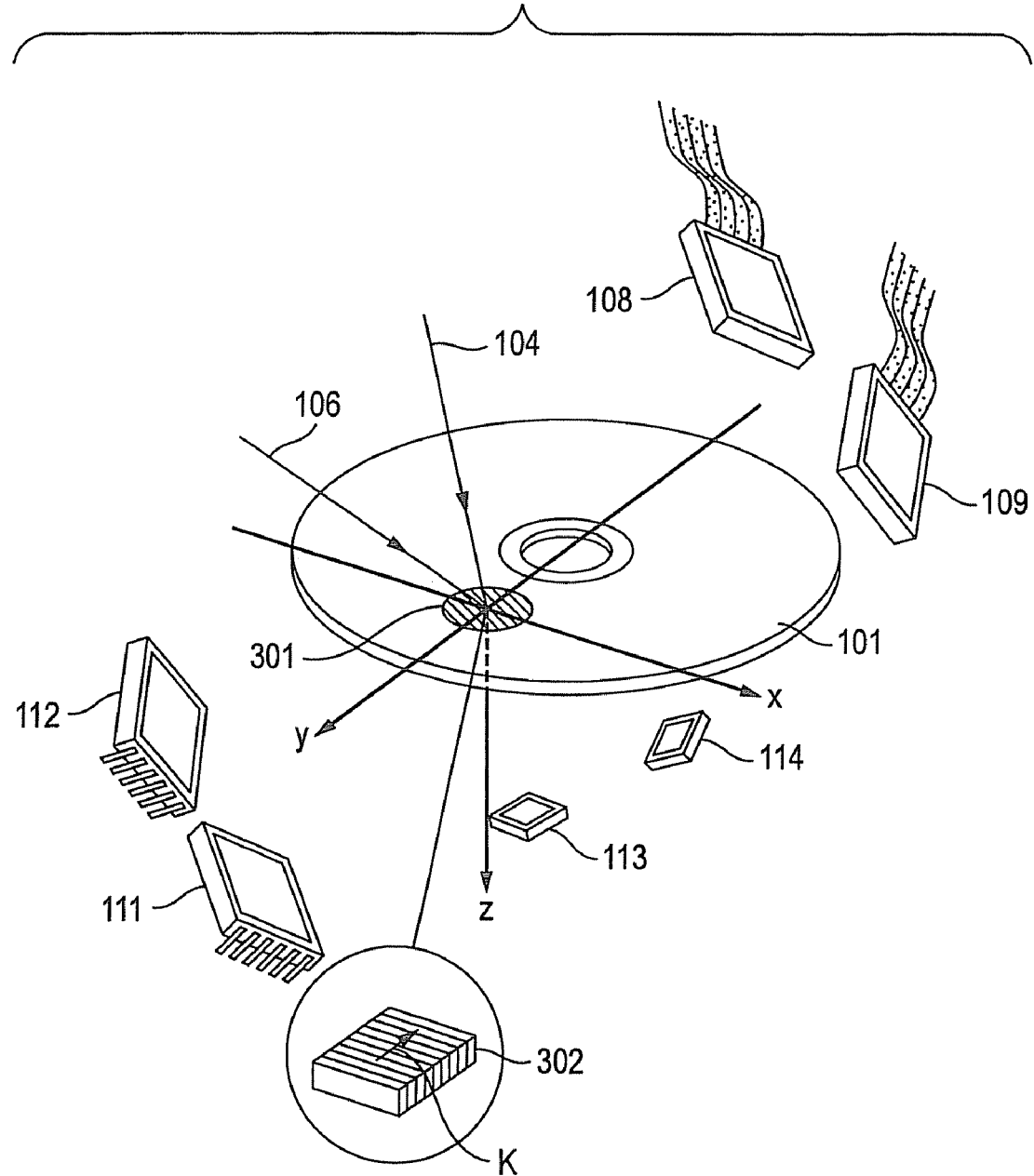
FIG. 6 is a diagram showing a method of recording a servo hologram and an information hologram in the first embodiment.
Figure 8:
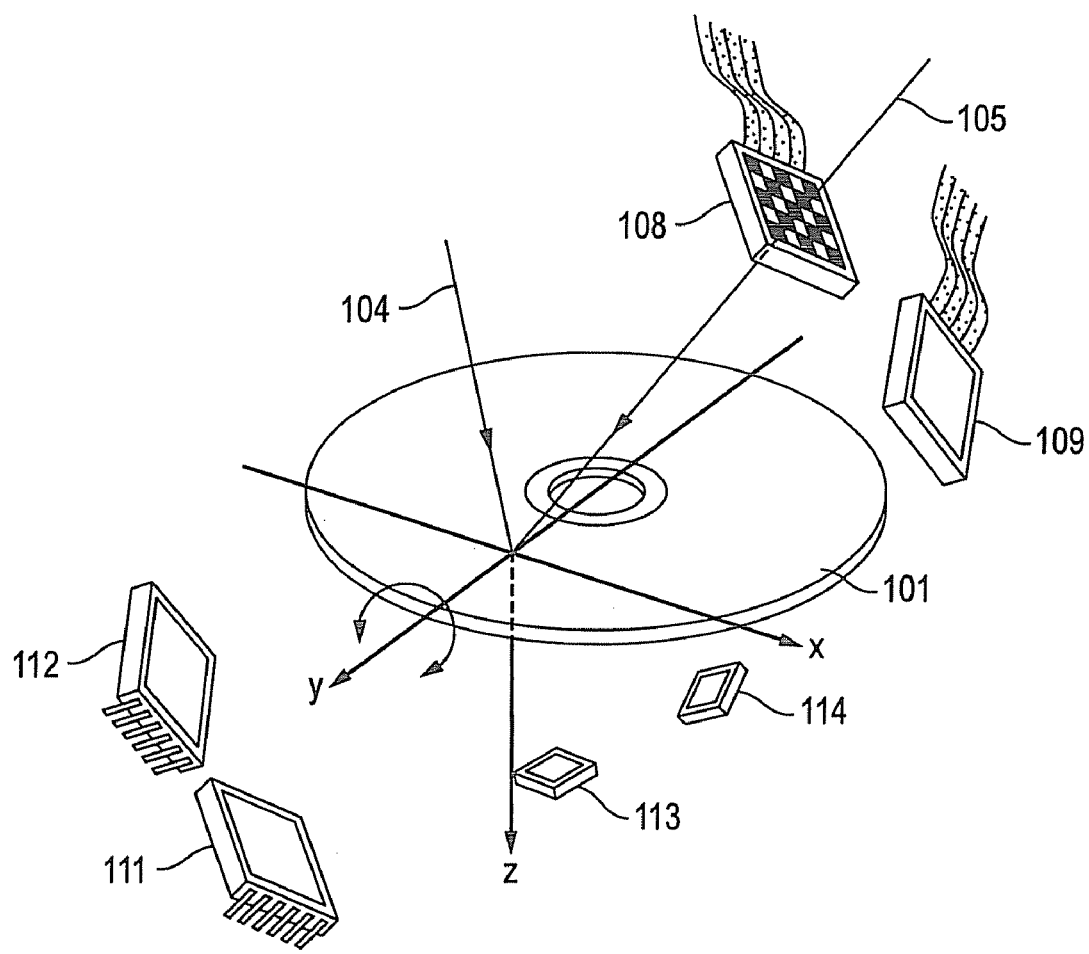
FIG. 8 is a diagram showing the method of recording the servo hologram and the information hologram in the first embodiment.
Figure 9:
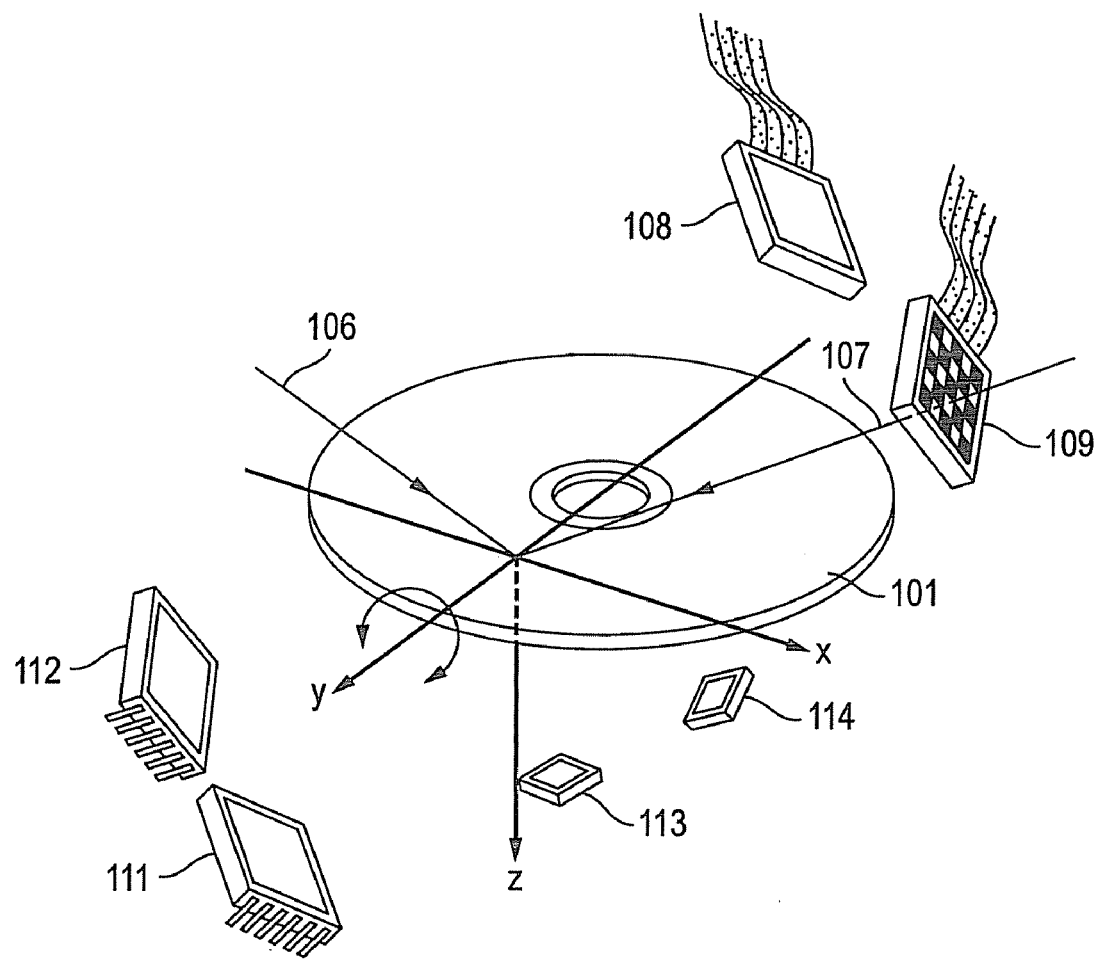
FIG. 9 is a diagram showing the method of recording the servo hologram and the information hologram in the first embodiment.

With reference to FIGS. 6, 8, and 9, next, a method of recording the servo hologram, and that of recording the is information hologram in the embodiment of the invention will be described. FIGS. 6, 8, and 9 show a manner of recording a hologram 301 in the recording disc 101, and also an unslanted grating pattern 302 of the hologram 301.

For the sake of convenience in description, an xyz orthogonal coordinate system is set as illustrated. Namely, the disc face of the recording disc 101 is set as the xy plane, and the thickness direction (in the figures, the downward direction) of the recording disc 101 is set as the z axis.

Before a target information hologram is recorded, the recording disc 101 is irradiated with the first reference beam 104 and the second reference beam 106, and the hologram 301 is recorded into the recording medium 102 as shown in FIG. 6. Since the hologram 301 is recorded by using a parallel light flux, the hologram 301 in which the noise level is low, or which is excellent is obtained.

At this time, it is necessary to form an unslanted grating pattern 302 in the recording medium 102.

Reproduced light from the unslanted grating pattern 302 is robust to a temperature change. This is because, as described with reference to FIGS. 3 to 5, thermal expansion due to a temperature change in the thickness direction of the recording medium is large, but, in the case of the unslanted grating pattern 302, the direction change of the grating vector K is small.

In order to form the unslanted grating pattern 302, the illumination of the first reference beam 104 and the second reference beam 106 must be performed in a mirror image relationship with respect to the xz plane.

When the incident angle of the first reference beam 104 to the recording disc is indicated by $\theta_1$ and the angle of orientation from the x axis is indicated by $\phi_1$, the ray vector $R_1$ of the first reference beam is given by the following Equation (1).

$$R_1 = (\sin\theta_1 \cos\phi_1, \sin\theta_1 \sin\phi_1, \cos\theta_1) \tag{1}$$

On the other hand, when the incident angle of the second reference beam 106 to the recording disc is indicated by $\theta_2$ and the angle of orientation from the x axis is indicated by $\phi_2$, the ray vector $R_2$ of the second reference beam is given by the following Equation (2)

$$R_2 = (\sin\theta_2 \cos\phi_2, \sin\theta_2 \sin\phi_2, \cos\theta_2) \tag{2}$$
$$= (\sin\theta_1 \cos\phi_1, -\sin\theta_2 1\sin\phi_1, \cos\theta_1)$$

Namely, $\theta_2 = \theta_1$ and $\phi_2 = -\phi_1$ are attained, and the first reference beam 104 and the second reference beam 106 are in a mirror image relationship with respect to the xz plane. When this condition may be used, a grating vector in which only the y component is non-zero can be formed. Namely, the grating vector K is given by the following Equation (3) and formed as a grating vector in which only the y component is non-zero.

$$K = (0, K_y, 0) \tag{3}$$

In the recording disc 101, the recording medium 102 is sandwiched by the both substrates 103, and the boundary conditions are different among the upper, lower, right, and left sides. During recording, therefore, the recording disc contracts by about 0.1%. However, also the contraction direction is anisotropic, and the, thickness direction of the substrates 103 is dominant. Therefore, the unslanted grating pattern 302 is robust also to the contraction.

In the recording system of the hologram reproducing apparatus in the embodiment, the angle multiplexing (hereinafter, referred to as $\theta_y$ angle multiplexing) system in which the recording disc 101 is rotated about the y axis, and the shift multiplication system in which multiplication is performed while the beam spot position on the recording disc 101 is shifted by the target rotation of the recording disc 101 are used in combination.

Figure 7:
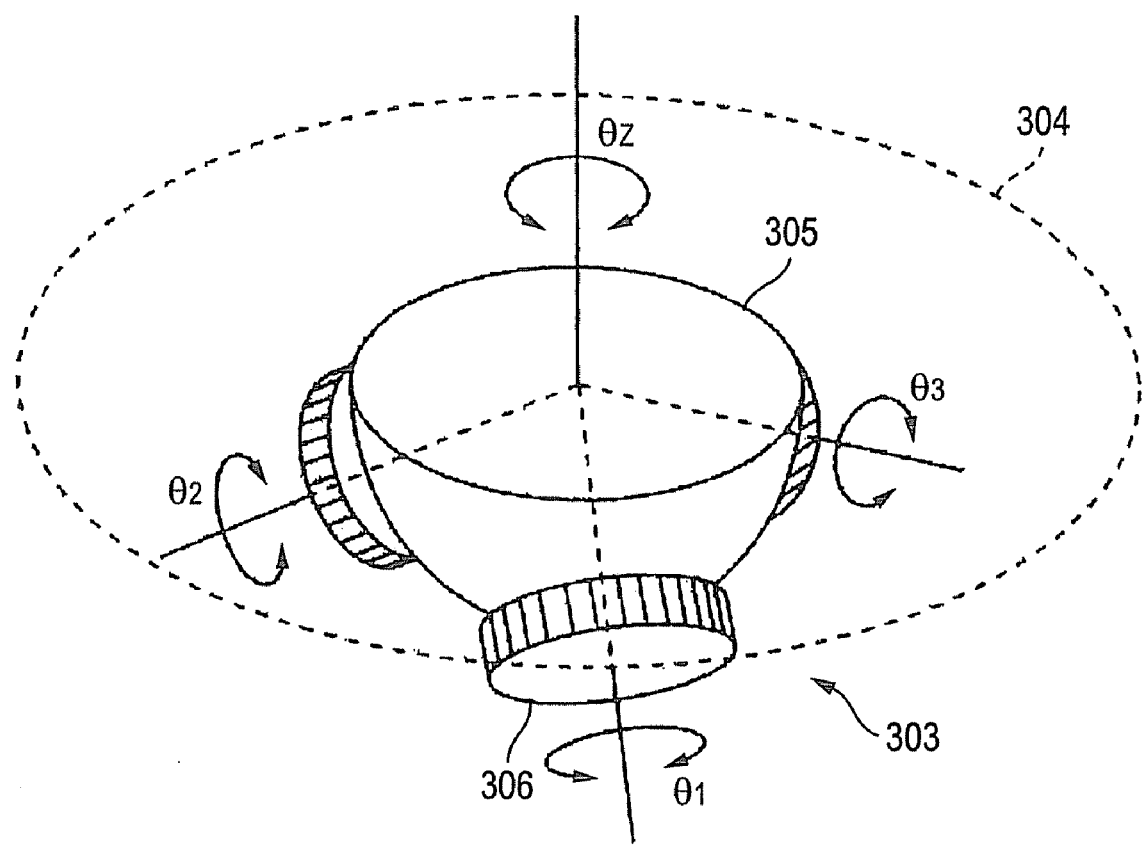
FIG. 7 is a diagram showing a disc rotating mechanism in the first embodiment.

The hologram reproducing apparatus in the embodiment is assumed to have: a driving mechanism for rotation about the y axis; a driving mechanism for rotation about the z axis (the target disc rotation); and a driving mechanism for rotation about the x axis for fine adjustment. FIG. 7 shows a configuration example of the disc rotating mechanism. In the example, a small spherical ultrasonic motor 303 is shown. In order to hold a recording disc 304, a semispherical rotor 305 may be used. A mechanism in which the three axes are friction driven by three stators 306 is employed. When rotations about the three axes are combined with one another, it is possible to realize an arbitrary rotation.

Recording of Information Hologram

Next, a method of recording information into the recording medium 102 will be described. FIG. 8 is a diagram showing the case where recording is performed on the recording disc 101 with simultaneously irradiating the recording disc with the first signal beam 105 and the first reference beam 104. The first signal beam 105 is encoded with a binary pattern consisting of bright and dark points, by the spatial light modulator 108. The information holograms are recorded by the $\theta_y$ angle multiplexing system using the first reference beam 104.

As shown in FIG. 9, similarly with the above-described method of recording the information hologram, next, recording is performed on the recording disc 101 with simultaneously irradiating the recording disc with the second signal beam 107 and the second reference beam 106. The second signal beam 107 is encoded with a binary pattern consisting of bright and dark points, by the spatial light modulator 109. The information holograms are recorded by the $\theta_y$ angle multiplexing system using the second reference beam 106.

Although, in the above, the description has been made in the sequence of "recording of servo hologram" and "recording of information hologram", the recording sequence is not restricted to this. Alternatively, "recording of information hologram" and "recording of servo hologram" may be performed in this sequence, or "recording of information hologram" may be interrupted and "recording of servo hologram" may be performed.

Reproducing Method

Figure 10:
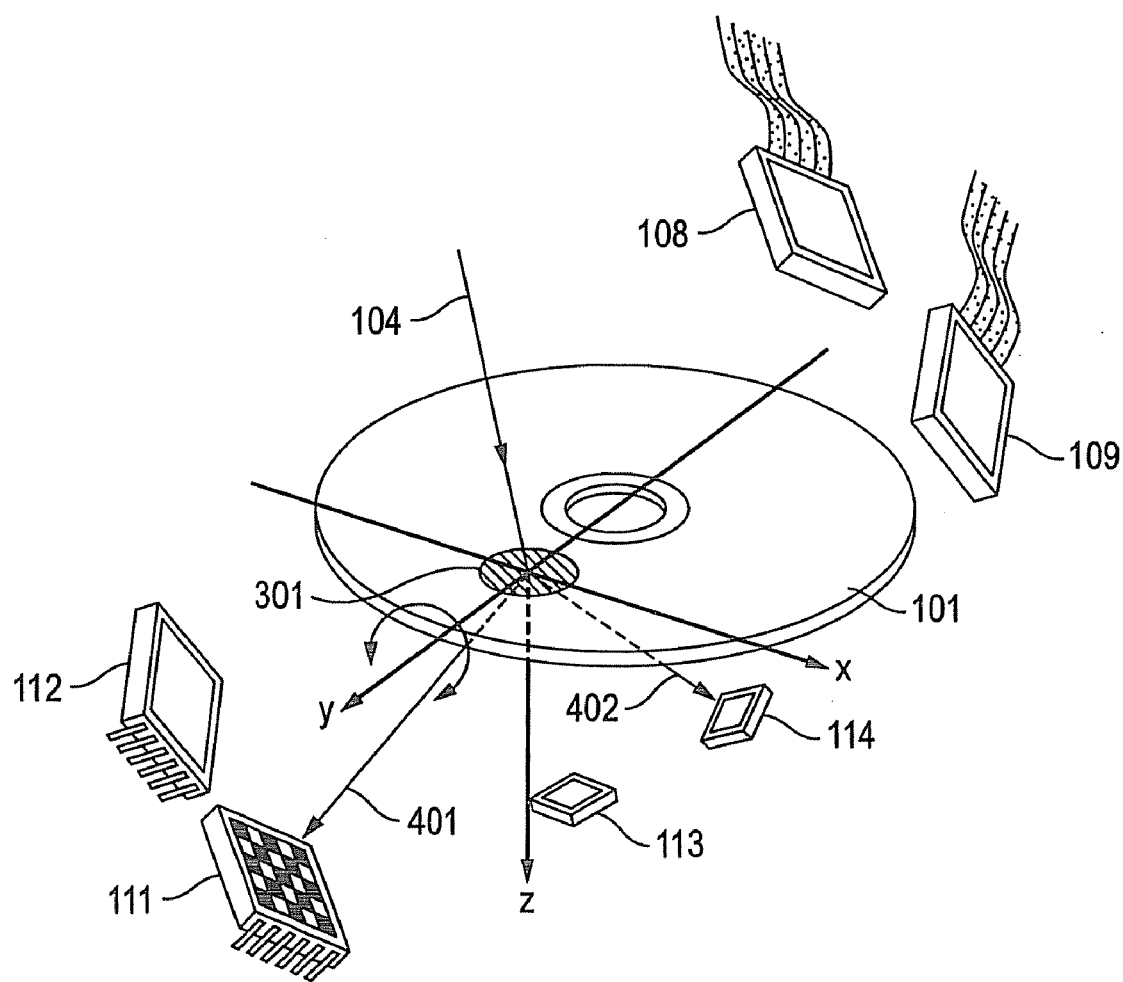
FIG. 10 is a diagram showing the method for reproducing the servo hologram and the information hologram in the first embodiment.
Figure 11:
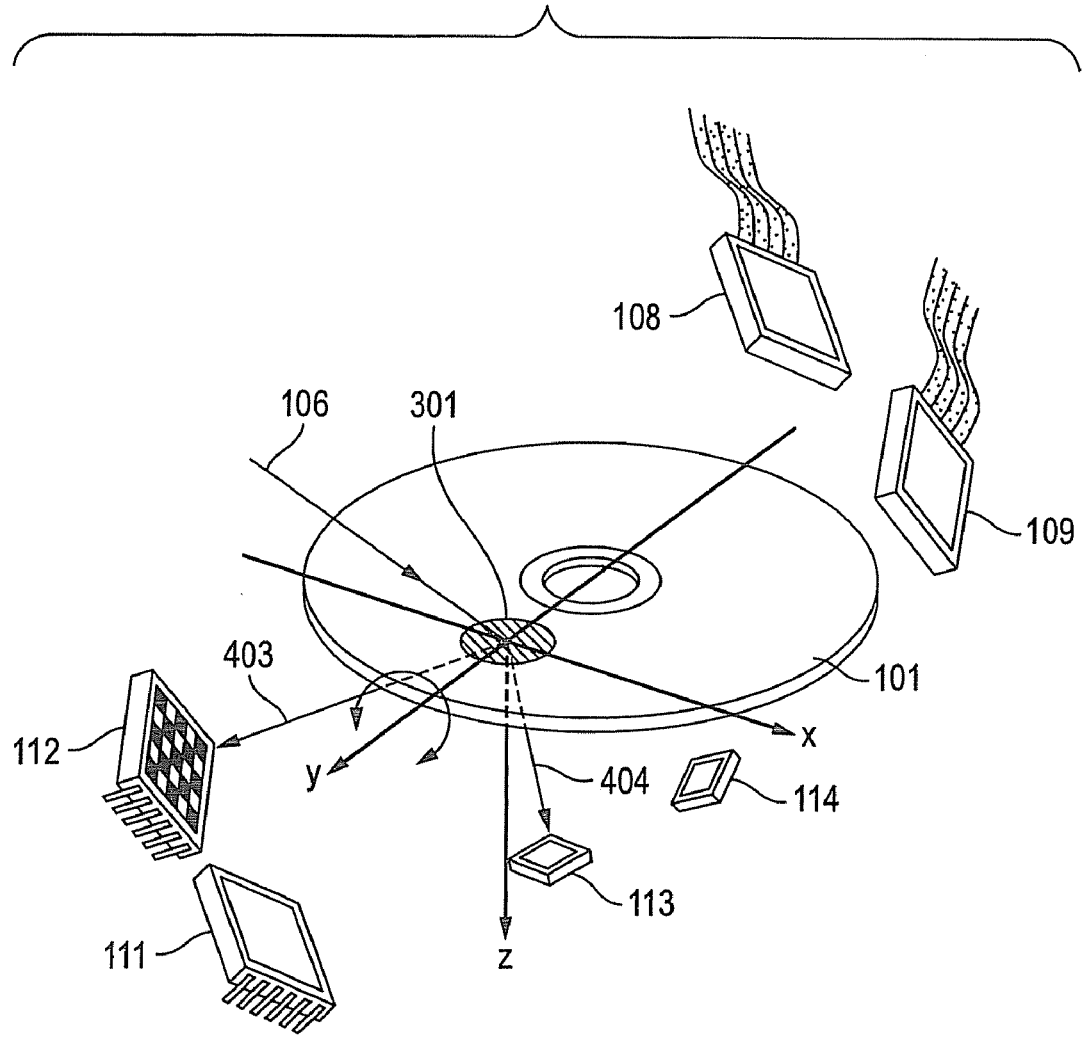
FIG. 11 is a diagram showing the method for reproducing the servo hologram and the information hologram in the first embodiment.

Referring to FIGS. 10 and 11, next, a method for reproducing the servo hologram and information hologram which are recorded in the recording disc 101 in the embodiment will be described.

For the sake of convenience in description, an xyz orthogonal coordinate system is set as illustrated. Namely, the disc face of the recording disc 101 is set as the xy plane, the thickness direction (in the figures, the downward direction) of the recording disc 101 is set as the z axis.

FIG. 10 is a diagram showing the method for reproducing the servo hologram and information hologram which are recorded is the recording disc 101. The figure shows reproduced light 401 from the information hologram, and reproduced light 402 from the servo hologram. The reproduced light 401 and the reproduced light 402 are generated by irradiating the hologram 301 formed in the recording disc 101, with the first reference beam 104, to cause diffraction therefrom.

As shown in FIG. 10, the recording disc 101 is irradiated only with the first reference beam 104, and the image pickup device 111 receives the reproduced light 401 diffracted from the information hologram 301 recorded in the recording disc 101, while $\theta_y$-rotating the recording disc 101. Thereafter, the received reproduced image is decoded to obtain information.

At this time, in accordance with the irradiation of the first reference beam 104, also the reproduced light 402 from the servo hologram 301 is generated simultaneously with the reproduced light 401. The reproduced light 402 is received by the photodetector 114. The information received by the photodetector 114 may be used as position information for the servo control.

As shown in FIG. 11, similarly with FIG. 10, next, the recording disc 101 is irradiated only with the second reference beam 106, and the image pickup device 112 receives the reproduced light 403 diffracted from the information hologram 301 recorded in the recording disc 101, while $\theta_q$-rotating the recording disc 101. The reproduced light 404 from the servo hologram 301 is received by the photodetector 113.

According to the embodiment, it is possible to provide a hologram reproducing apparatus in which positioning for reproduction that is robust to a temperature change is enabled. Therefore, the spot position which is $\theta_y$-angle multiplexing recorded can be highly accurately detected, and, particularly, positional deviation in the disc tangential direction can be detected with a high degree of accuracy. Optical devices which are to be newly disposed are only the photodetectors and circuit components associated therewith. Therefore, the embodiment can be easily embodied. The reproduced light from the information hologram, and that from the servo hologram advance through the different optical paths, and hence a crosstalk-free system is realized. Furthermore, it is requested only to write at least one servo hologram on an angle multiplexing recorded spot of about several hundred multiplications. Therefore, a waste of M/# (which is an index indicating the multiple performance of a recording medium) and reduction of the recording capacity due to recording of the servo hologram are in a negligible range.

Second Embodiment

Figure 12:
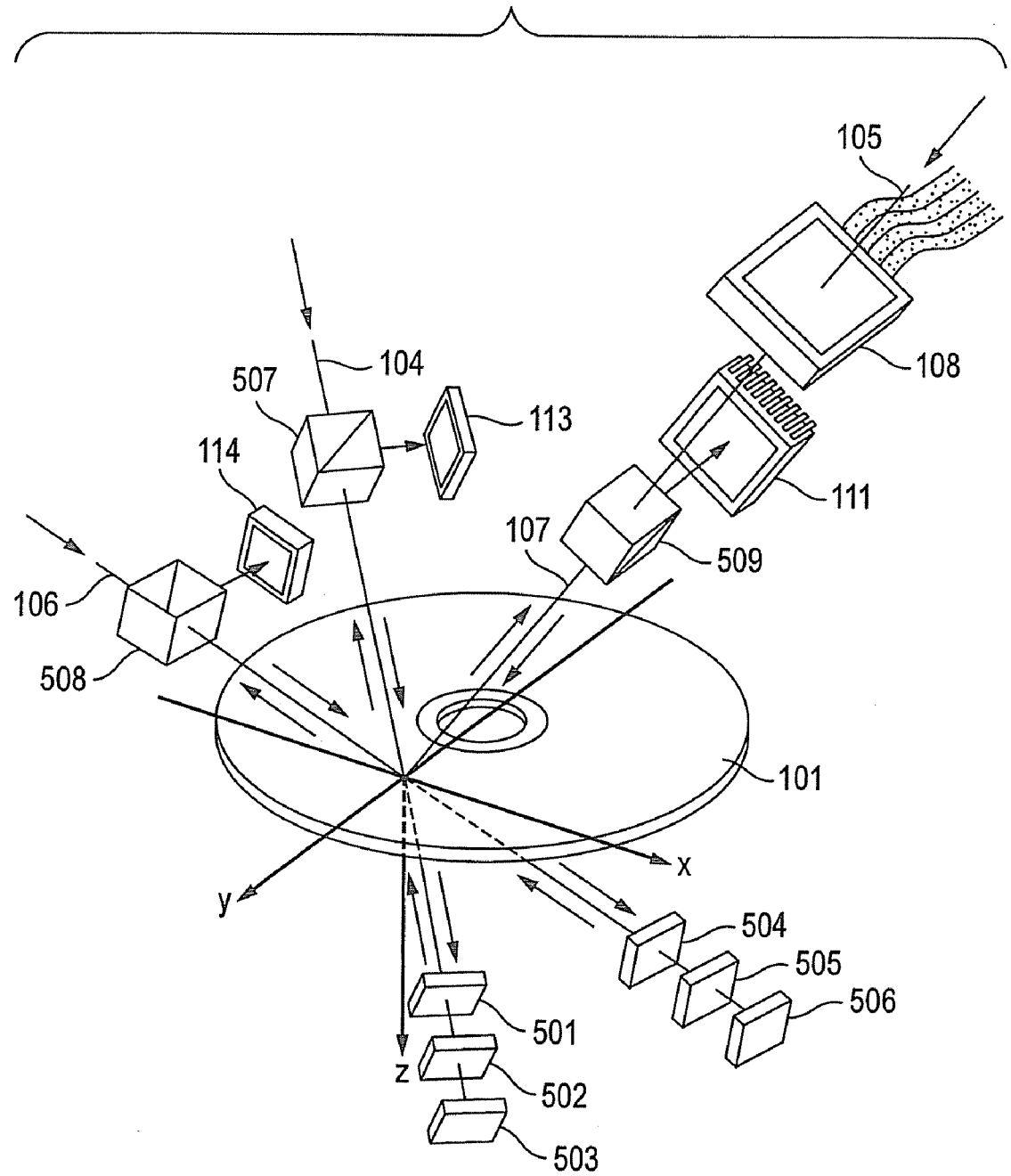
FIG. 12 is a diagram of a hologram reproducing apparatus which uses phase conjugate reproduction in a second embodiment.

FIG. 12 is a diagram of a hologram reproducing apparatus which uses phase conjugate reproduction according to a second embodiment of the invention.

In the second embodiment, a total of three optical paths for the first signal beam 105 which is caused to irradiate the recording disc 101 by an objective lens (not shown), and the first reference beam 104 and second reference beam 106 which are parallel light fluxes are configured. In order to avoid complication of the figure, the objective lens is not shown, and only the central ray of the first signal beam 105 is shown. In order to attain a phase conjugate reproduction system, $\lambda/4$ plates 502, 505 and mirror 503, 506 are placed on the side which is opposite across the recording disc 101. Furthermore, the apparatus includes shutters 501, 504. In order to separate phase conjugate reproduced light, the apparatus further includes polarizing beam splitters 507, 508, 509 on the light incident side. Examples of a phase conjugate reproduction system are disclosed in the following publications:

JP-A-2006-317886; and
US 2006/0232574 A1.

In the embodiment, multiplex recording is performed while rotating the recording disc 101, or recording is performed by using "$\theta_y$ angle multiplexing", and "shift multiplication" which is performed while the beam spot position on the recording disc is shifted by the target rotation of the disc. Namely, recording is performed in the same manner as the first embodiment. Hereinafter, recording of a servo hologram, recording of an information hologram, and a method for reproducing them will be sequentially described.

Figure 13:
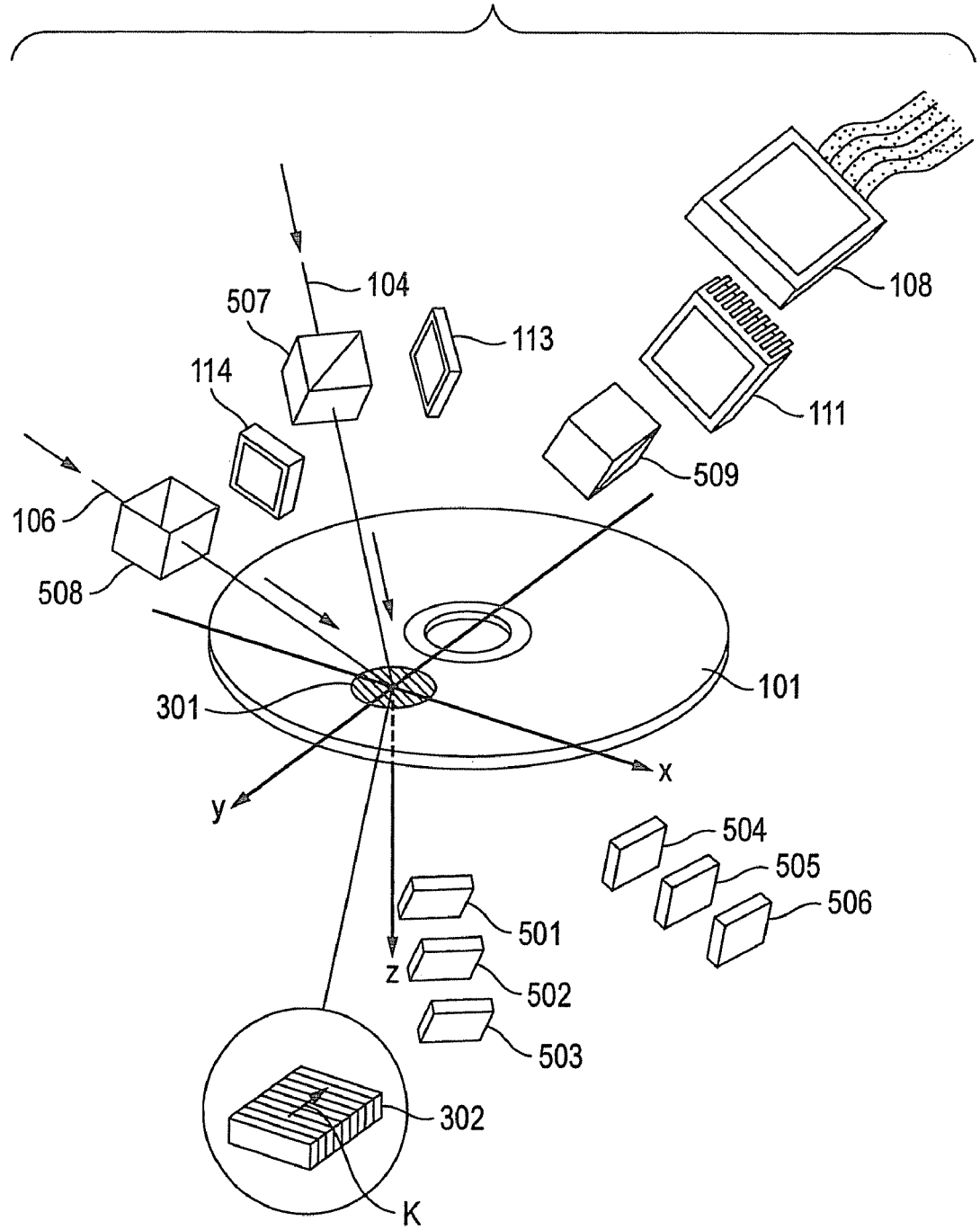
FIG. 13 is a diagram showing a method of recording a servo hologram and an information hologram in the second embodiment.
Figure 14:
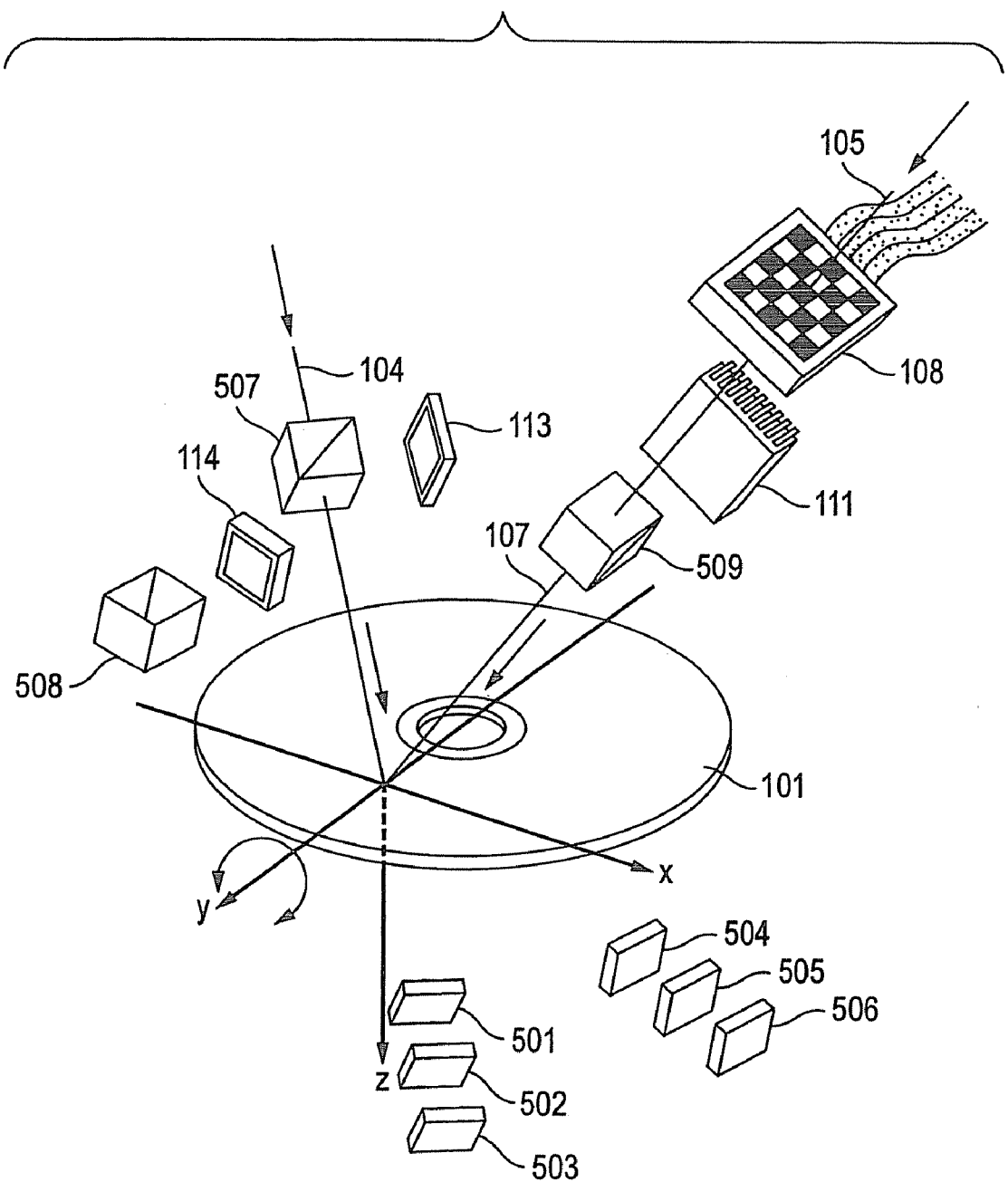
FIG. 14 is a diagram showing the method of recording the servo hologram and the information hologram in the second embodiment.
Figure 15:
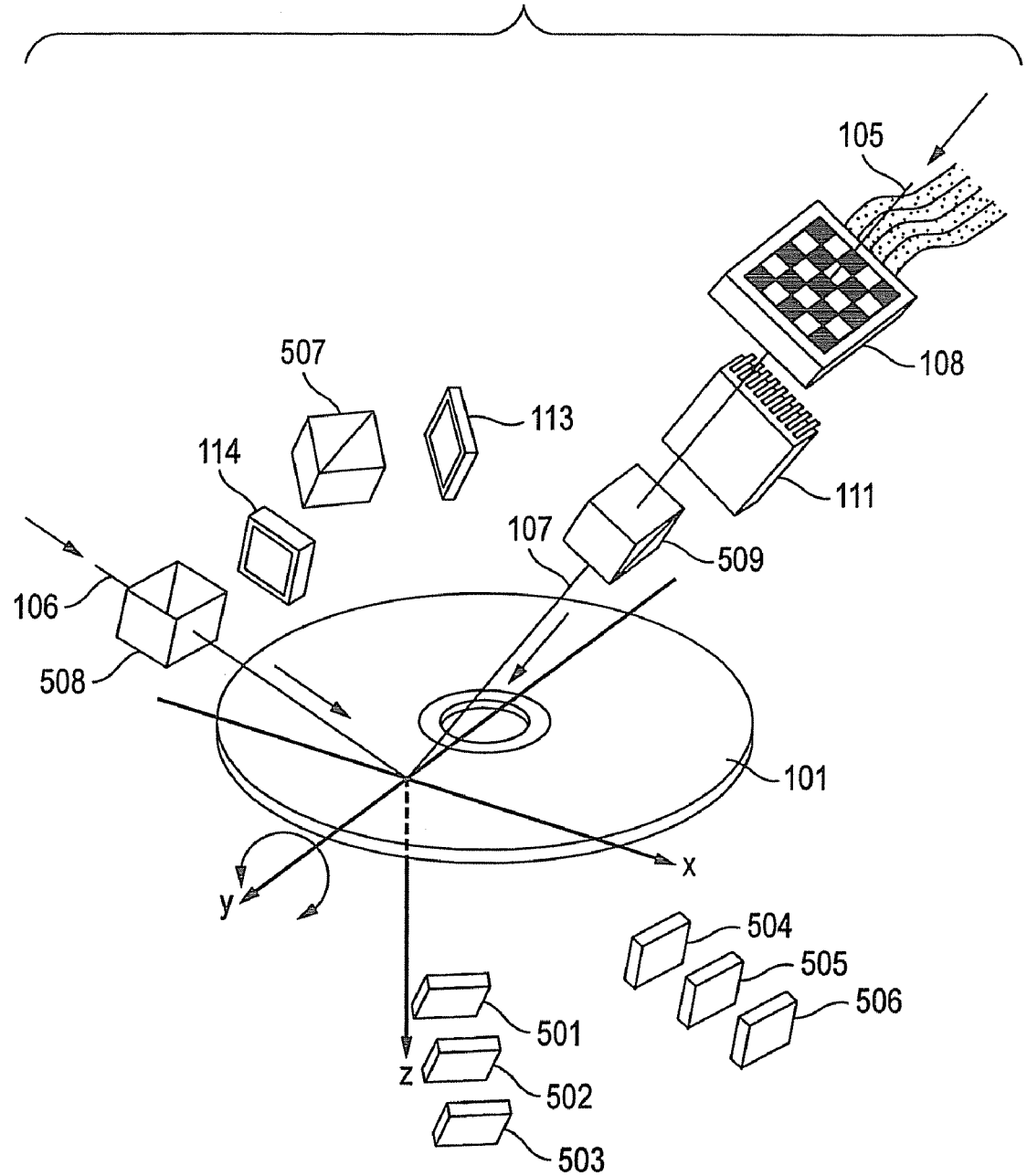
FIG. 15 is a diagram showing the method of recording the servo hologram and the information hologram in the second embodiment.

FIGS. 13 to 15 are diagrams showing a method of recording the servo hologram, and that of recording the information hologram in the second embodiment.

Recording of Servo Hologram

Before a target information hologram is recorded, as shown in FIG. 13, the recording disc 101 is simultaneously irradiated with the first reference beam 104 which is a parallel light flux, and the second reference beam 106 which is a parallel light flux, and the servo hologram 301 is recorded into the recording medium 102. In a similar manner as the first embodiment, the two kinds of reference beam are symmetrically placed so as to form in a mirror image relationship with respect to the xz plane, thereby recording an unslanted grating pattern 302 in the recording medium.

Since the unslanted grating pattern 302 is recorded by using two parallel light fluxes, the unslanted grating pattern is a hologram in which the noise level is low, or which is excellent.

Recording of Information Hologram

As shown in FIG. 14, next, the recording disc 101 is irradiated with the first signal beam 105 through the spatial light modulator 108 and the beam splitter 509. Namely, the light modulator 108 causes information which is encoded with a binary pattern consisting of bright and dark points to be carried on light, and then the light is converged on the recording disc 101. At the same time, the recording disc 101 is irradiated with the first reference beam 104, and recorded into the disc by the $\theta_y$ angle multiplexing. As shown in FIG. 15, then, the recording disc 101 is irradiated with the first signal beam 105 through the spatial light modulator 108 and the beam splitter 509. Thereafter, the reference beam is switched to the second reference beam 106, the same place of the recording disc 101 is irradiated with the reference beam, and recording is performed by the $\theta_y$ angle multiplexing.

In a similar manner as the description in the first embodiment, the description has been made in the sequence of "recording of servo hologram" and "recording of information hologram", but the recording sequence is not restricted to this. Alternatively, "recording of information hologram" and "recording of servo hologram" may be performed in this sequence, or "recording of information hologram" may be interrupted and "recording of servo hologram" may be performed.

Reproducing Method

Next, referring to FIGS. 16 and 17, a method for reproducing the servo hologram and information hologram which are recorded in the recording disc 101 as described above will be described.

Figure 16:
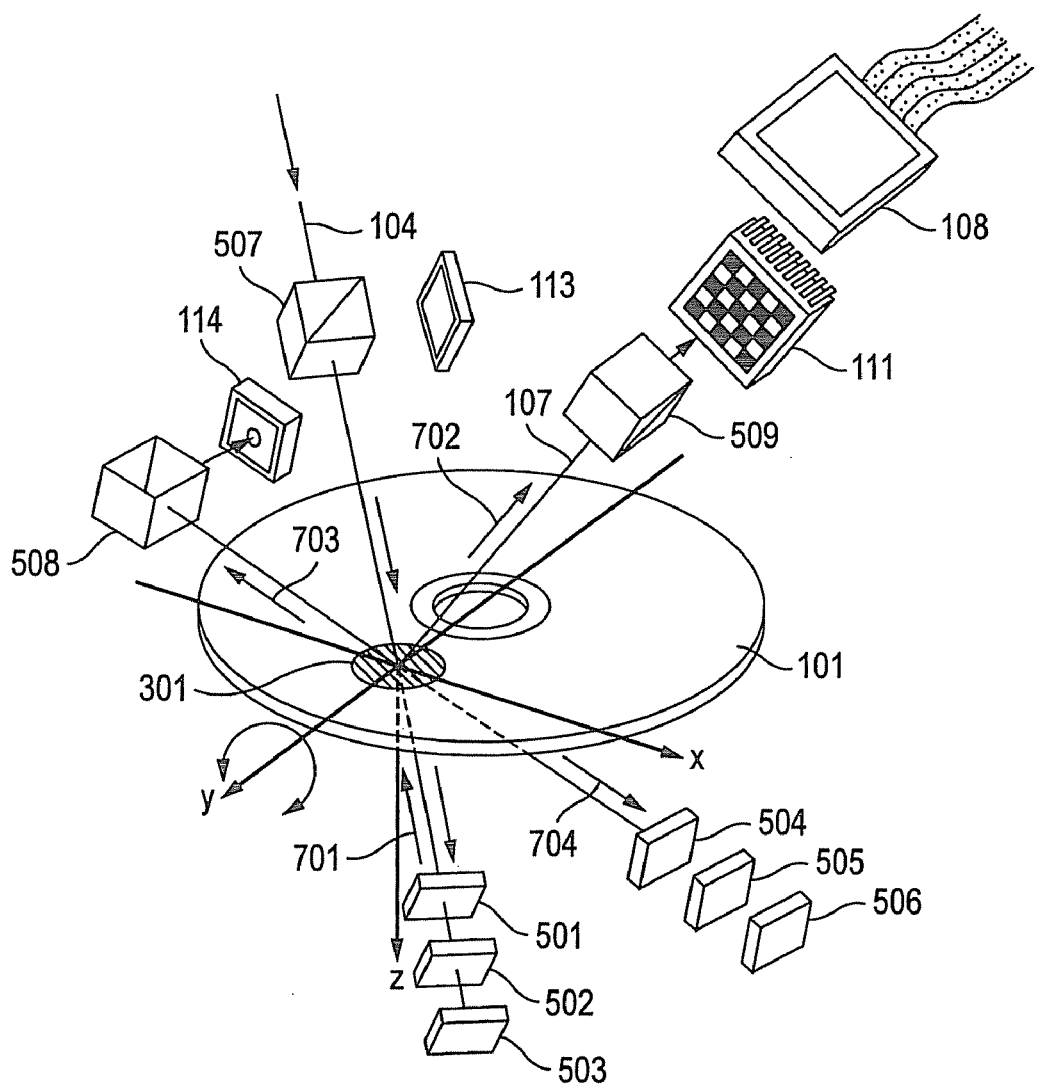
FIG. 16 is a diagram showing a method for reproducing the servo hologram and the information hologram in the second embodiment.
Figure 17:
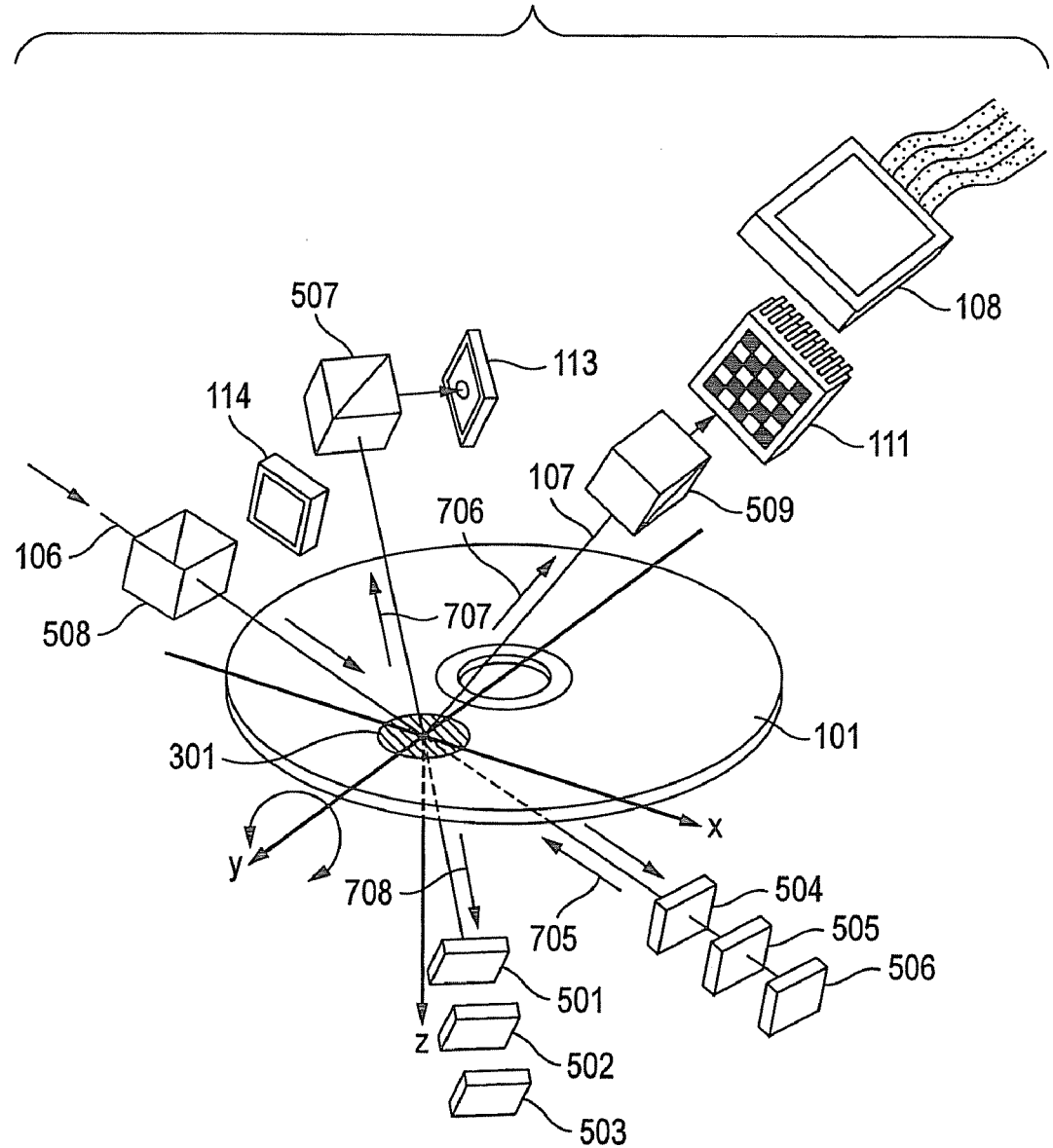
FIG. 17 is a diagram showing the method for reproducing the servo hologram and the information hologram in the second embodiment.

FIG. 16 is a diagram showing the method for reproducing the servo hologram and information hologram which are recorded in the recording disc 101.

In reproduction, the recording disc 101 is irradiated only with the first reference beam 104. It is assumed that the first reference beam 104 is P-polarized.

As shown in FIG. 16, only the first reference beam 104 impinges on the recording disc 101 through the beam splitter 507. Then, the recording disc 101 is irradiated with reflected light 701 which becomes S-polarized after passing through the recording disc 101 and reciprocating through the shutter 501, the λ/4 plate 502, and the mirror 503. Here, the shutter 501 is set to the open state, and the laser of the first reference beam 104 is allowed to pass through in a state where it reciprocates through the incident path. By the reflected light 701 which impinges from the side of the λ/4 plate 502 and the mirror 503, diffracted light which is phase conjugate is generated from the hologram 301 recorded in the recording disc 101. The diffracted light is formed as reproduced light 702 from the information hologram, and as reproduced light 703 from the servo hologram, respectively. The reproduced light 703 from the servo hologram is diffracted light from the servo hologram which is recorded by simultaneous irradiation with two sets of the first reference beam 104 and the second reference beam 106.

The reproduced light 702 from the information hologram is reflected by the polarizing beam splitter 509, and received by the image pickup device 111. Thereafter, a reproduced image received by the image pickup device 111 is decoded to obtain information.

On the other hand, the reproduced light 703 from the servo hologram is reflected by the polarizing beam splitter 508, and received by the photodetector 114. There is a possibility that reproduced light 704 produced by the first reference beam 104 during incidence becomes noises. Therefore, the shutter 504 may be set to the close state to cut off the light. When the noises are at a non-problematic level, the shutter 504 may be set to the open state.

The other second reference beam 106 operates in a similar manner as the above-described operation. As shown in FIG. 17, only the second reference beam 106 impinges on the recording disc 101 through the polarizing beam splitter 508. The recording disc 101 is irradiated with reflected light 705 which becomes S-polarized after passing through the recording disc 101 and reciprocating through the shutter 504, the λ/4 plate 505, and the mirror 506.

By the reflected light 705 which impinges from the side of the λ/4 plate 505 and the mirror 506, diffracted light which is phase conjugate is generated from the hologram 301 recorded in the recording disc 101. The diffracted light is formed as reproduced light 706 from the information hologram, and as reproduced light 707 from the servo hologram, respectively.

The reproduced light 707 from the servo hologram is diffracted light from the hologram which is recorded by simultaneous irradiation with two sets of the first reference beam 104 and the second reference beam 106.

The reproduced light 706 from the information hologram is reflected by the polarizing beam splitter 509, and received by the image pickup device 111. Thereafter, the received reproduced image is decoded to obtain information.

On the other hand, the reproduced light 707 from the servo hologram is reflected by the polarizing beam splitter 507, and received by the photodetector 113. There is a possibility that reproduced light 708 produced by the first reference beam 104 during incidence becomes noises. Therefore, the shutter 501 may be set to the close state to cut off the light. When the noises are at a non-problematic level, the shutter 501 may be set to the open state.

According to the embodiment, it is possible to provide a hologram reproducing method in which positioning for reproduction that is robust to a temperature change is enabled. Therefore, the spot position which is $\theta_y$-angle multiplexing recorded can be highly accurately detected, and, particularly, positional deviation in the disc tangential direction can be detected with a high degree of accuracy. The embodiment is characterized also in that the embodiment may be applied also to phase conjugate reproduction which is advantageous to reduction in size of an apparatus.

The present invention is not limited to the first and second embodiments which are described above, and various changes or combinations in design may be made without departing the spirit and the scope of the present invention. The reproducing apparatuses of the embodiments may be provided with mechanism and components for recording disc 101.

Hereinafter, examples of the present invention will be described.

EXAMPLE 1

A servo hologram and an information hologram are recorded in the method which has been described in the first embodiment, and the recording disc 101 is irradiated with the first reference beam 104 as shown in FIG. 10. For the reproduced signal received by the second photodetector 114, the characteristics of the reproduced signal from the servo hologram 301 are checked. The characteristics of the reproduced light which is detected by the first photodetector 113 when the recording disc 101 is irradiated with the second reference beam 106 are identical with the above characteristics, and the description of the characteristics is omitted.

The intensity of the reproduced signal from the servo hologram 301 is subjected to the electromagnetic field analysis by using the RCWA (Rigorous Coupled-Wave Analysis) method. In an analysis in the case where two fluxes are in the same plane, Kogelnik's Coupled-Wave Theory, which is an approximate theory, may be applied. However, a precision analysis in the case where the optical path of the first reference beam 104 is not in the same plane as in the invention is beyond the range of Coupled-Wave Theory. Therefore, numerical calculation is performed by using the RCWA method that is a rigorous analysis method from which approximation is eliminated from Coupled-Wave Theory. Details of the Kogelnik's Coupled-Wave Theory are described in the following document.

H. Kogelnik, "Coupled-wave theory for thick hologram gratings", Bell Sys. Tech. J. 48, 2909-2947 (1969)

The analysis conditions are set to appropriate specification values, or the laser wavelength of 405 nm and the recording medium thickness of 1,000 μm. Both the incident angles of the first reference beam 104 and the second reference beam 106 are set to 50 deg., and the angles of orientation are set to $\phi_1$=45 degrees and $\phi_2$=−45 degrees, respectively. Therefore, an unslanted grating pattern, i.e., a hologram in which the grating vector is in the recording medium plane can be recorded. The analysis technique and conditions are identical with those in (Example 2), (Example 3), and (Example 4) below.

Figure 18:
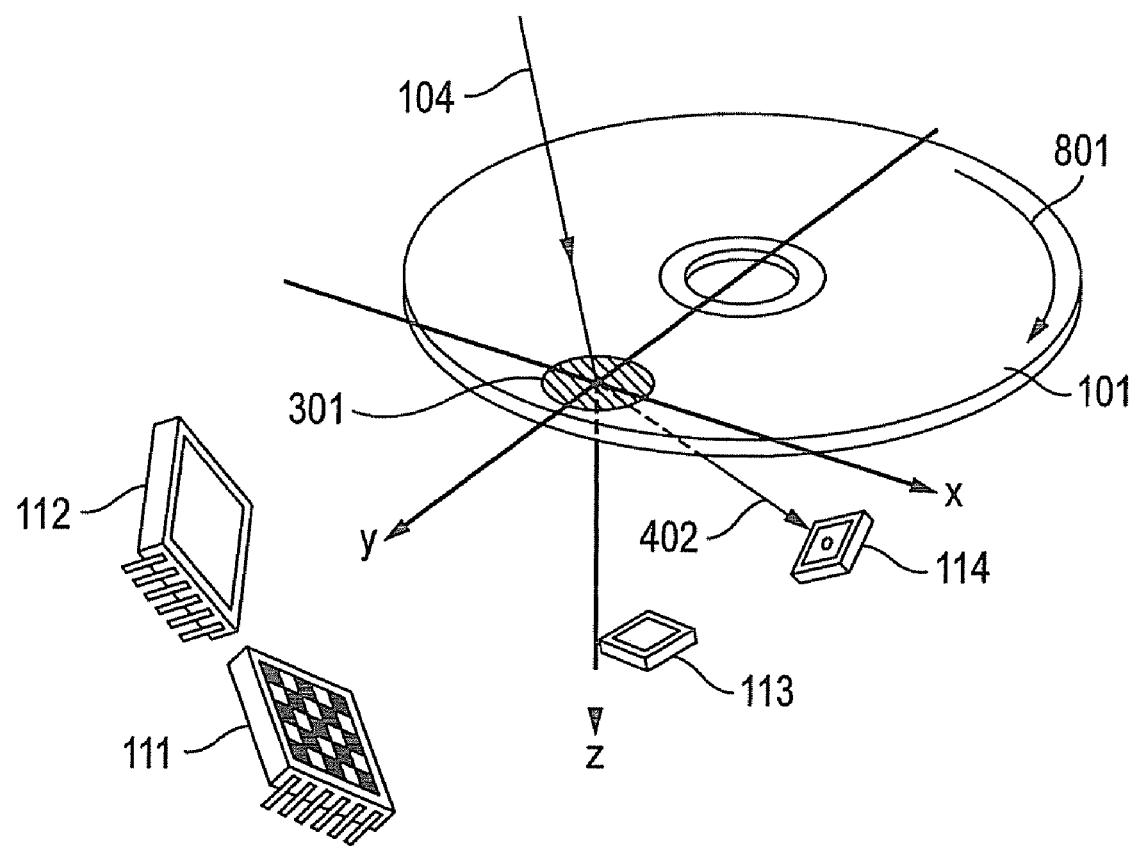
FIG. 18 is a diagram of an optical arrangement for measuring characteristics of a reproduced signal from a servo hologram with respect to disc rotation.
Figure 19:
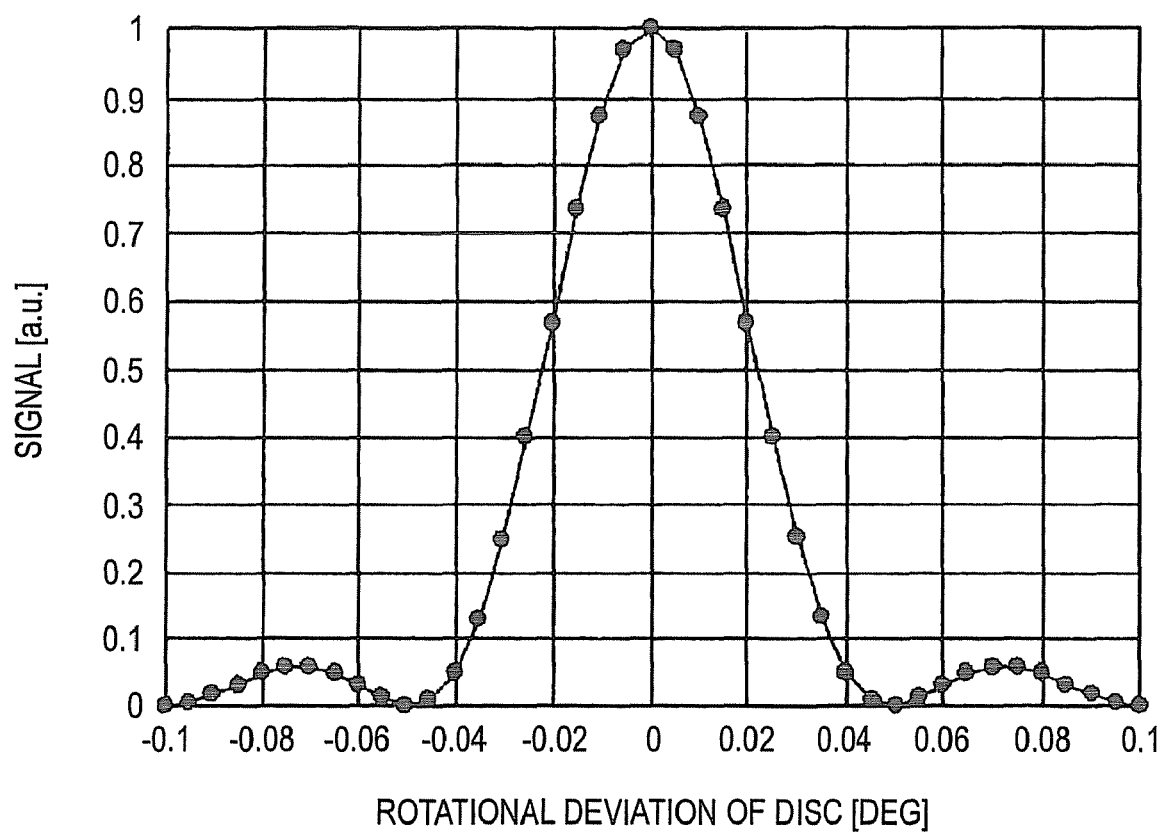
FIG. 19 is a view showing characteristics of a reproduced signal from a servo hologram with respect to disc rotation.

FIG. 18 shows an optical arrangement for measuring the characteristics of the reproduced signal from the servo hologram 301 with respect to disc rotation 801, and FIG. 19 shows results of the checks on the characteristics of the reproduced signal from the servo hologram 301 with respect to the disc rotation 801. The horizontal axis of the graph indicates the deviation angle of the disc rotation 801 from the position where the servo hologram is recorded, and the vertical axis indicates the light receiving amount in the second photodetector 114. As shown in FIG. 19, the reproduced signal approximately has a waveform of $sinc^2(x)$, and, when a deviation of the disc rotation 801 from the recorded position is ±0.05 deg., the intensity of the reproduced signal is lowered to the vicinity of zero. It is seen that, when the signal may be used, the position where the servo hologram is recorded can be highly accurately detected. With using the characteristics, therefore, the position where the signal intensity is maximum may be searched, and the rotation may be performed under servo control.

EXAMPLE 2

Figure 20:
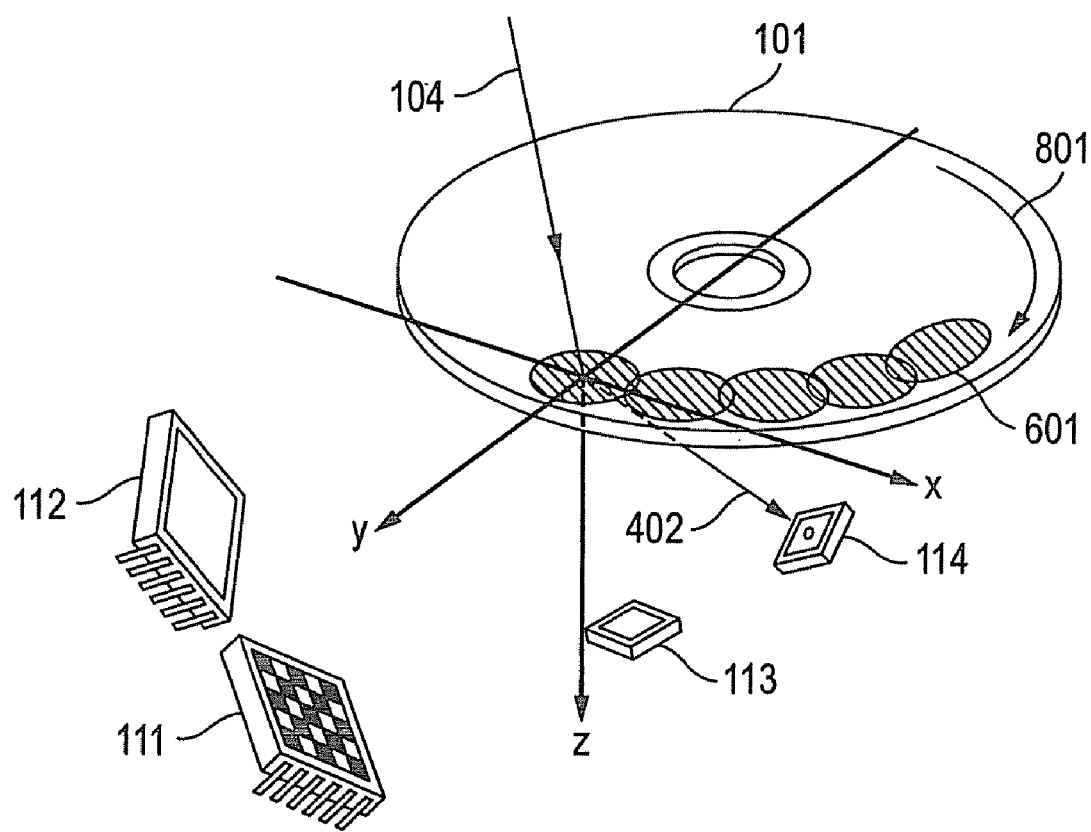
FIG. 20 is a diagram of an optical arrangement for measuring characteristics of a reproduced signal from servo holograms which are recorded for each spot.
Figure 21:
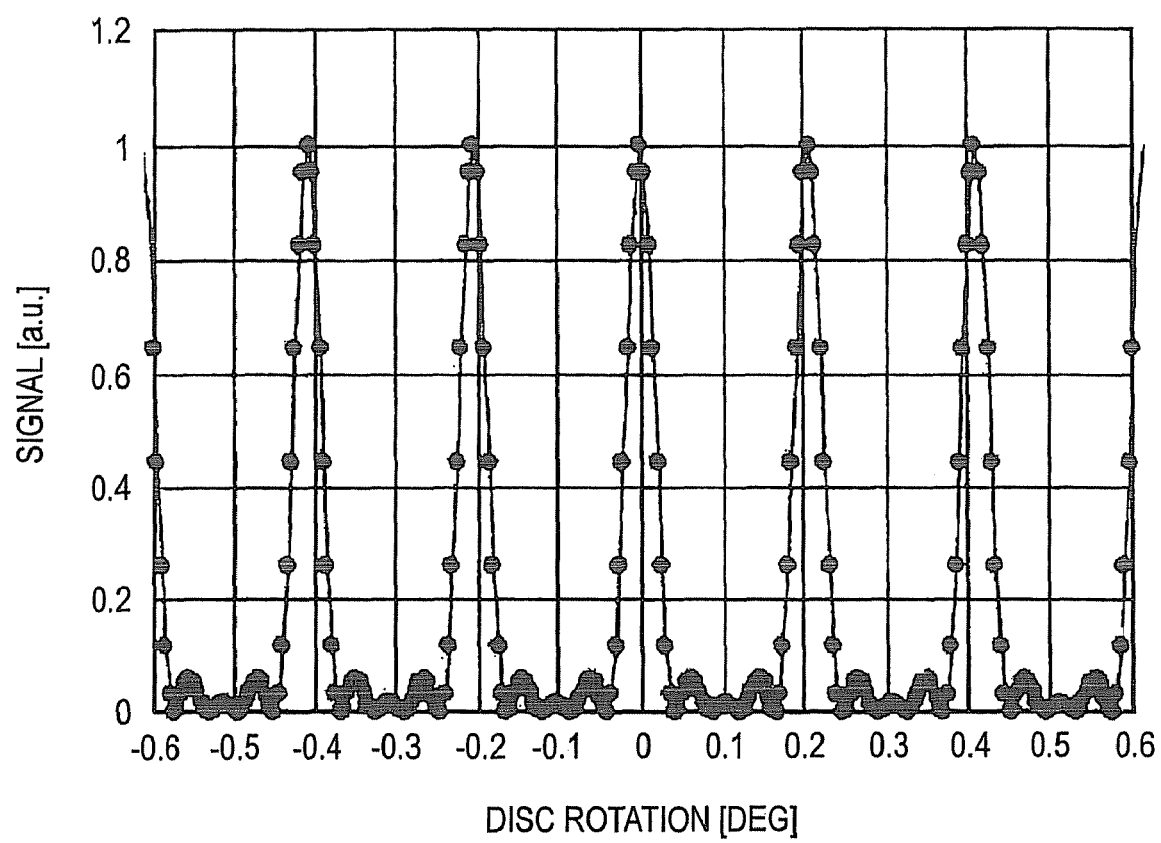
FIG. 21 is a view showing characteristics of a reproduced signal from the servo holograms which are recorded for each spot.

As shown in FIG. 20, a servo hologram 601 is recorded in each spot in the method which has been described in the first embodiment. FIG. 21 shows results of the checks on the characteristics of the reproduced signal from the servo hologram 601 with respect to the disc rotation 801. In the case where the recording disc is irradiated with the second reference beam 106, the signal characteristics of the reproduced light received by the first photodetector 113 are identical with the characteristics, and hence description thereof is omitted.

The horizontal axis indicates the angle of the disc rotation 801 from the position where the servo hologram 601 is recorded, and the vertical axis indicates the light receiving amount in the second photodetector 114. It is seen that, when the signal may be used, the recorded position can be highly accurately detected.

In a hologram recording/reproducing system, in order to realize high-density recording, it is necessary to increase the numerical aperture of an objective lens and the thickness of a recording medium. In accordance with this, the tolerance for the disc rotation 801 (deviation in the disc tangential direction) is extremely reduced. From the above, it is seen that the reproduction positioning method in the embodiment is very useful.

EXAMPLE 3

Figure 22:
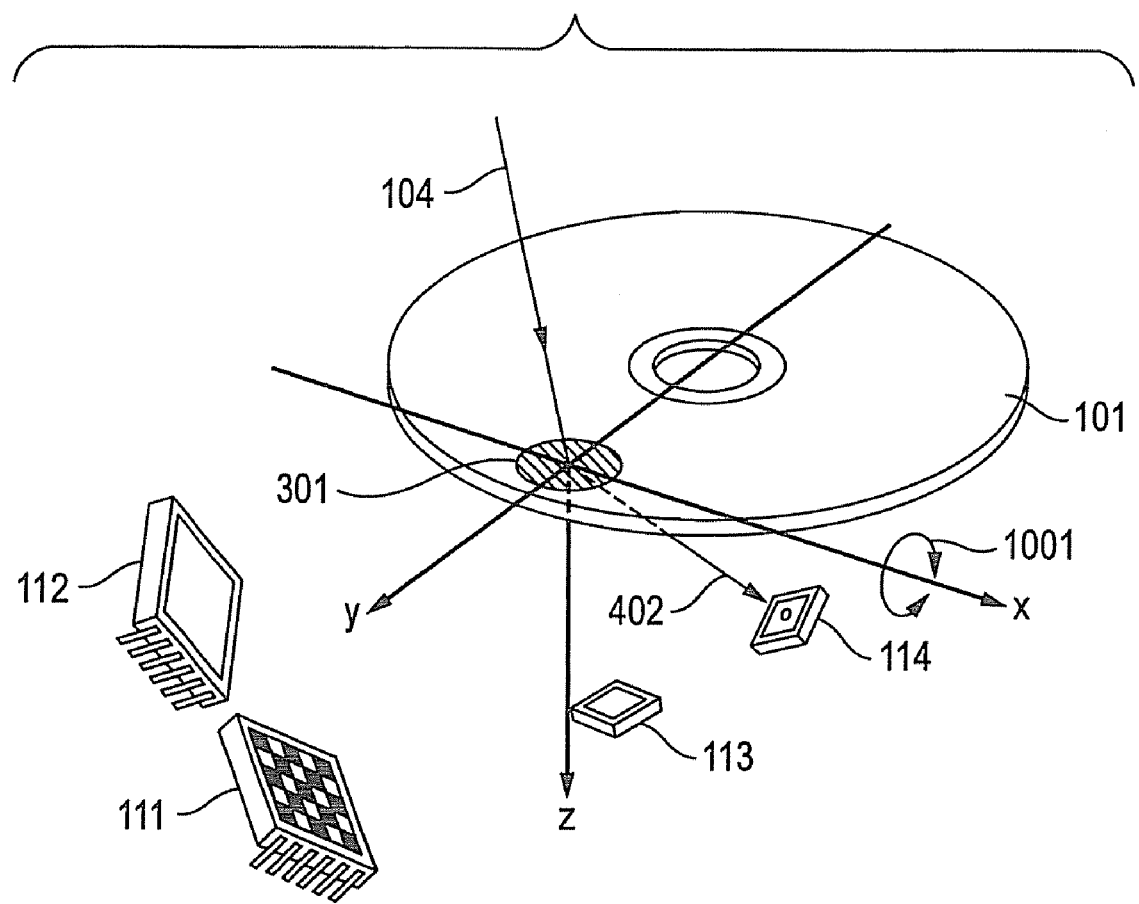
FIG. 22 is a diagram of an optical arrangement for measuring a reproduced signal from a servo hologram with respect to rotational deviation about the x axis.

A servo hologram and an information hologram are recorded in the method which has been described in the first embodiment. The characteristics of the reproduced signal from the servo hologram 301 with respect to x-axis rotation 1001 in the recording disc 101 are checked for the reproduced signal which is received by the second photodetector 114 when the recording disc 101 is irradiated with the first reference beam 104 as shown in FIG. 22. Here, the rotation axis about which the e angle multiplexing is performed is the y axis, and the x axis is perpendicular to the axis. In the case where the recording disc 101 is irradiated with the second reference beam 106, the signal characteristics of the reproduced signal received by the first photodetector 113 are identical with the characteristics, and hence description thereof is omitted.

Figure 23:
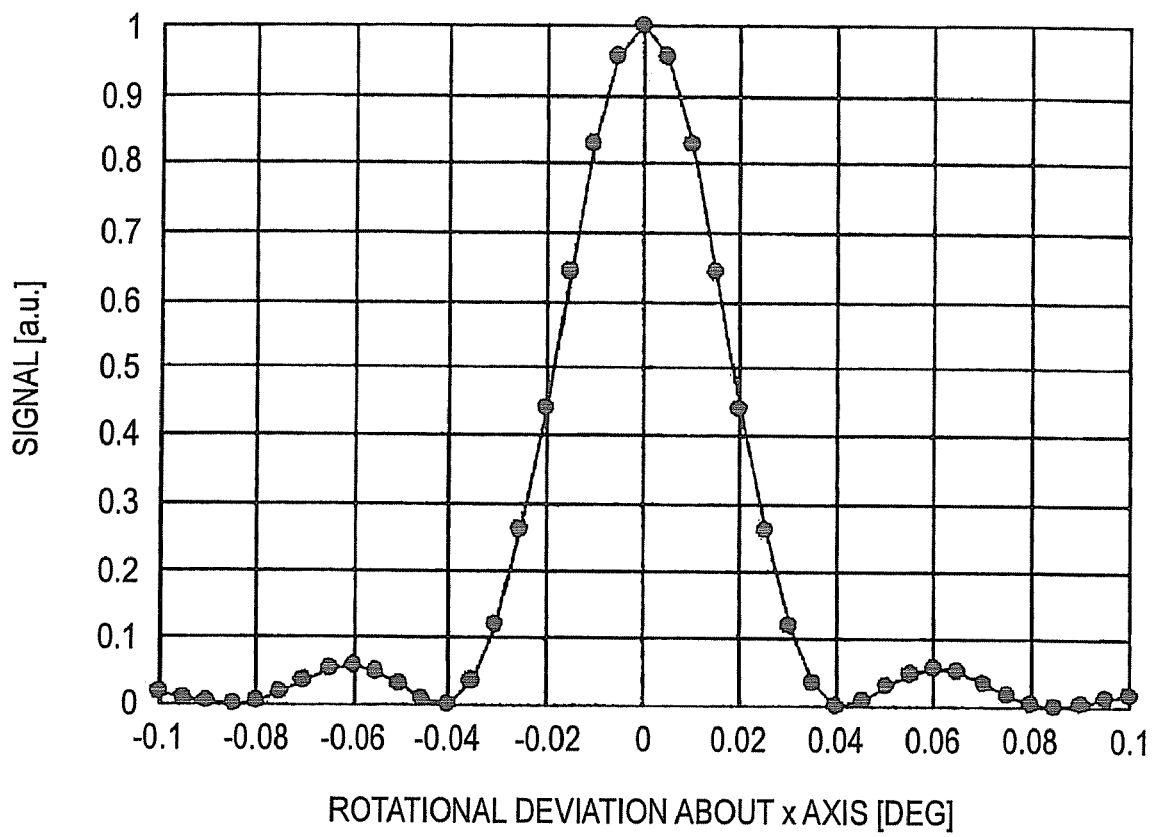
FIG. 23 is a view showing characteristics of a reproduced signal from the servo hologram with respect to rotational deviation about the x axis.

FIG. 23 shows results of the checks on the characteristics of the reproduced signal from the servo hologram 301 with respect to the x-axis rotation 1001. The horizontal axis indicates the deviation angle of the x-axis rotation 1001 from the recorded position, and the vertical axis indicates the light receiving amount in the second photodetector 114. As shown in FIG. 23, the reproduced signal approximately has a waveform of $sinc^2(x)$, and, when a deviation of the x-axis rotation 1001 from the recorded position is ±0.04 degrees, the signal intensity is lowered to the vicinity of zero. It is seen that, when the signal may be used, the recorded rotation position can be highly accurately detected.

EXAMPLE 4

Figure 24:
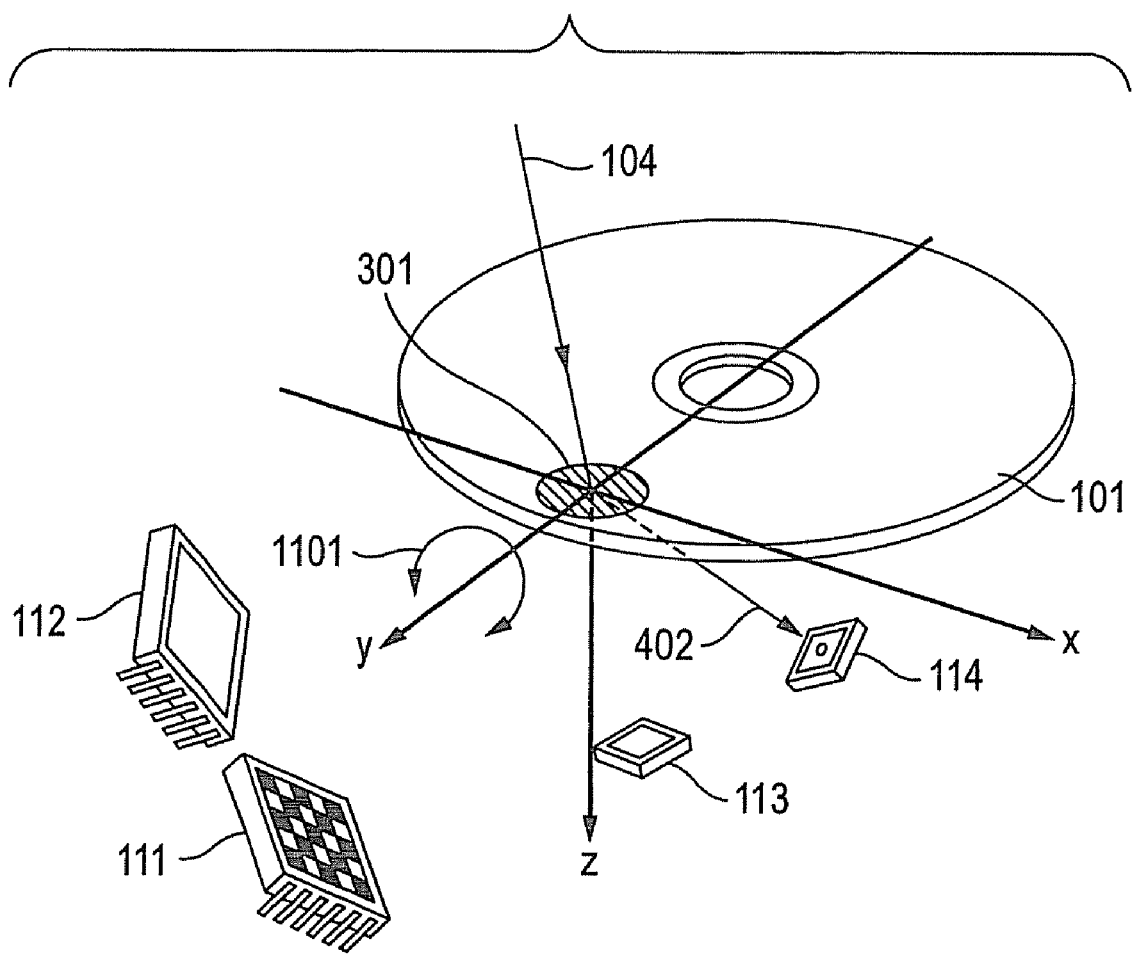
FIG. 24 is a diagram of an optical arrangement for measuring characteristics of a reproduced signal from a servo hologram with respect to $\theta_y$ rotation.

A servo hologram and an information hologram are recorded in the method which has been described in the first embodiment. The characteristics of the reproduced signal from the servo hologram 301 with respect to y-axis rotation 1101 in the recording disc 101 are checked for the reproduced signal which is received by the second photodetector 114 when the recording disc 101 is irradiated with the first reference beam 104 as shown in FIG. 24. Here, the rotation axis about which the $\theta_y$ angle multiplexing is performed is the y axis, and the x axis is perpendicular to the axis. In the case where the recording disc 101 is irradiated with the second reference beam 106, the signal characteristics of the reproduced signal received by the first photodetector 113 are identical with the characteristics, and hence description thereof is omitted.

Figure 25:
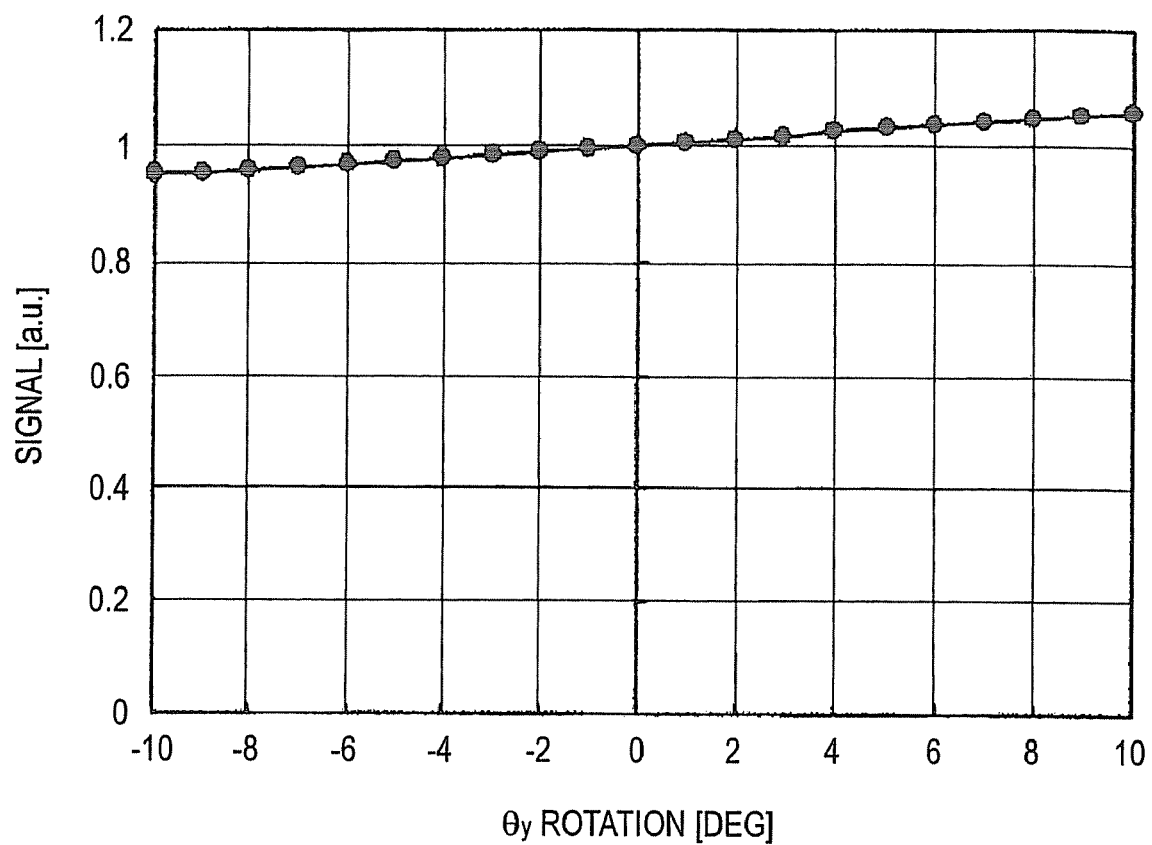
FIG. 25 is a view showing characteristics of a reproduced signal from a servo hologram with respect to $\theta_y$ rotation.

FIG. 25 shows results of the checks on the characteristics of the reproduced signal from the servo hologram 301 with respect to the y-axis rotation 1101. The horizontal axis indicates the angle of the y-axis rotation 1101, and the vertical axis indicates the light receiving amount in the second photodetector 114. In the embodiment, in the hologram reproducing apparatus, the $\theta_y$ angle multiplexing is performed while conducting the y-axis rotation 1101. As shown in FIG. 25, the intensity of reproduced signal is not substantially changed with the change ±10 degrees of the y-axis rotation 1101. This seems to be a natural result of the spatial arrangement of the holograms recorded by two sets of reference beam, and the spatial arrangement of the reference beam. When the characteristics are used, it is possible to always monitor the servo signal in the case where information recorded by the $\theta_y$ angle multiplexing is reproduced while conducting the y-axis rotation 1101.

It is to be understood that the invention is not limited to the specific embodiments described above and that the invention can be embodied with the components modified without departing from the spirit and scope of the invention. The invention can be embodied in various forms according to appropriate combinations of the components disclosed in the embodiments described above. For example, some components may be deleted from the configurations described as the embodiments. Further, the components described in different embodiments may be used appropriately in combination.

What is claimed is:
1. A method for reproducing a hologram, the method comprising:
    irradiating a recording disc with a first reference beam and a second reference beam, both having a parallel light flux, in different directions at a same incident angle to form a hologram having an unslanted grating pattern in which a grating vector is parallel to a light incident surface of the recording disc;

irradiating the hologram with the first reference beam or the second reference beam to extract reproduced light; and detecting a position where an intensity of the reproduced light is maximum.

2. The method of claim 1, wherein the intensity of the reproduced light is detected while rotating the recording disc in a direction perpendicular to the grating vector of the unslanted grating pattern.

3. A method for reproducing a hologram, the method comprising:

irradiating a recording disc with a first reference beam and a second reference beam, both having a parallel light flux, in different directions at a same incident angle to form a first hologram having an unslanted grating pattern in which a grating vector is parallel to a light incident surface of the recording disc;

irradiating a position of the recording disc where the first hologram is formed with a first signal beam or a second signal beam which is produced as a binarized pattern by a spatial light modulator to cause interference with the first reference beam or the second reference beam to thereby to form a second hologram;

irradiating the first hologram formed in the recording disc with the first reference beam or the second reference beam to extract reproduced light;

detecting a position where an intensity of the reproduced light is maximum while rotating the recording disc about an axis that is perpendicular to the grating vector of the unslanted grating pattern, the axis being on the light incident surface of the recording disc;

detecting a position where an intensity of the reproduced light is maximum while rotating the recording disc in a direction perpendicular to the grating vector; and irradiating the detected position with the first reference beam or the second reference beam to reproduce the second hologram formed at the position where the first hologram is formed.

4. A method for reproducing a hologram, the method comprising:

irradiating a recording disc with a first reference beam and a second reference beam, both having a parallel light flux, in different directions at a same incident angle to form a first hologram having an unslanted grating pattern in which a grating vector is parallel to a light incident surface of the recording disc;

irradiating a position of the recording disc where the first hologram is formed with a first signal beam or a second signal beam which is produced as a binarized pattern by a spatial light modulator to cause interference with the first reference beam or the second reference beam to thereby to form a second hologram;

irradiating the first hologram formed in the recording disc with the first reference beam or the second reference beam to extract reproduced light;

detecting a position where an intensity of the reproduced light is maximum while rotating the recording disc in a direction perpendicular to the grating vector of the unslanted grating pattern;

detecting a position where an intensity of the reproduced light is maximum while rotating the recording disc about an axis that is perpendicular to the grating vector, the axis being on the light incident surface of the recording disc; and irradiating the detected position with the first reference beam or the second reference beam to reproduce the second hologram formed at the position where the first hologram is formed.

* * * * *